US009605989B2

(12) United States Patent
Sato et al.

(10) Patent No.: US 9,605,989 B2
(45) Date of Patent: Mar. 28, 2017

(54) LIQUID PRESSURE METER, LIQUID LEVEL METER, AND WARNING SYSTEM

(71) Applicant: Seiko Epson Corporation, Tokyo (JP)

(72) Inventors: Kenta Sato, Shiojiri (JP); Kentaro Yoda, Chino (JP); Hisao Motoyama, Minamisouma (JP)

(73) Assignee: Seiko Epson Corporation (JP)

( * ) Notice: Subject to any disclaimer, the term of this patent is extended or adjusted under 35 U.S.C. 154(b) by 371 days.

(21) Appl. No.: 14/154,716

(22) Filed: Jan. 14, 2014

(65) Prior Publication Data

US 2014/0196538 A1    Jul. 17, 2014

(30) Foreign Application Priority Data

Jan. 16, 2013   (JP) .................................. 2013-005186
Feb. 7, 2013   (JP) .................................. 2013-022027

(51) Int. Cl.
*G01F 23/14*   (2006.01)
*G01L 7/08*   (2006.01)
*G01F 23/16*   (2006.01)
*G01L 9/00*   (2006.01)
*G01L 19/14*   (2006.01)

(52) U.S. Cl.
CPC ............ *G01F 23/14* (2013.01); *G01F 23/164* (2013.01); *G01L 7/08* (2013.01); *G01L 9/008* (2013.01); *G01L 9/0022* (2013.01); *G01L 19/149* (2013.01)

(58) Field of Classification Search
CPC .................................. G01F 23/14; G01L 7/08
See application file for complete search history.

(56) References Cited

U.S. PATENT DOCUMENTS

| 6,416,263 B1* | 7/2002 | Sato ........................ F16L 41/06 137/318 |
| 6,931,926 B1* | 8/2005 | Van Ee .................. F02D 33/003 73/291 |
| 2005/0115314 A1* | 6/2005 | Meagher ................. G01F 23/18 73/290 B |
| 2009/0122637 A1* | 5/2009 | Kruyer .................. B01F 5/0647 366/167.1 |
| 2013/0118263 A1 | 5/2013 | Sato et al. |

FOREIGN PATENT DOCUMENTS

| JP | 02-048823 U | 4/1990 |
| JP | 07-260548 A | 10/1995 |
| JP | 11-153469 A | 6/1999 |
| JP | 2006-242608 A | 9/2006 |
| JP | 2009-287927 A | 12/2009 |
| JP | 2012-181062 A | 9/2012 |
| JP | 2013-104753 A | 5/2013 |
| JP | 2013-104754 A | 5/2013 |

* cited by examiner

*Primary Examiner* — Hezron E Williams
*Assistant Examiner* — David Z Huang
(74) *Attorney, Agent, or Firm* — Harness, Dickey & Pierce, P.L.C.

(57) ABSTRACT

A liquid level meter includes: an exterior portion having an internal space which a liquid to be measured flows in; and a pressure sensitive portion provided inside the exterior portion and having a pressure sensitive surface; wherein the exterior has holes that it is arranged on each of a vertically lower side and a vertically upper side relative to the pressure sensitive surface, and the holes connect an inside and outside of the internal space.

9 Claims, 24 Drawing Sheets

LIQUID PRESSURE METER, LIQUID LEVEL METER, AND WARNING SYSTEM

BACKGROUND

1. Technical Field

The present invention relates to a liquid pressure meter, a liquid level meter, and a warning system.

2. Related Art

As a device that senses water levels (liquid levels), for example, a liquid level meter of JP-A-2009-287927 is known. The liquid level meter of JP-A-2009-287927 includes: a post main body having an internal space and an entry port through which a liquid is entered into the internal space; a proximity detection device provided inside the internal space; and a floating member that floats on a liquid surface of the liquid entered into the internal space. The floating member has an IC tag. The proximity detection device has plural IC tag readers arrayed in the direction of height. The liquid level meter of JP-A-2009-287927 is configured in such a way that the number (combination) of IC tags that can be read by the IC tag readers changes according to the height of the liquid surface of the liquid entered into the internal space and the liquid level is detected by following the change.

However, in the liquid level meter of JP-A-2009-287927, since no hole is formed for releasing air that exists in the internal space, the air remains in the internal space and this residual air obstructs the entry of a liquid from the entry port. Therefore, the liquid level meter of JP-A-2009-287927 has a problem that liquid levels cannot be detected accurately.

SUMMARY

An advantage of some aspects of the invention is that a liquid pressure meter, a liquid level meter and a warning system that can achieve excellent detection accuracy are provided.

The invention can be implemented as the following application examples.

Application Example 1

This application example is directed to a liquid pressure meter including: an exterior portion having an internal space which a liquid to be measured flows in; and a pressure sensitive portion provided inside the exterior portion and having a pressure sensitive surface; wherein the exterior portion has holes that it is arranged on each of a vertically lower side and a vertically upper side relative to the pressure sensitive surface, and the holes connect an inside and outside of the internal space.

Thus, since the air in the internal space can be eliminated effectively, a liquid pressure meter that can achieve excellent detection accuracy can be provided.

Application Example 2

In the liquid pressure meter of the application example described above, it is preferable that an opening on the side of the internal space, of the hole of the vertically lower, is arranged at a position avoiding a center of the pressure sensitive surface as viewed in a plan view of the pressure sensitive surface.

Thus, application of other external forces than liquid pressure on the pressure sensitive surface can be prevented effectively.

Application Example 3

In the liquid pressure meter of the application example described above, it is preferable that an opening on an outer side of the exterior portion, of the hole of the vertically lower, is arranged at a position avoiding the pressure sensitive surface as viewed in a plan view of the pressure sensitive surface.

Thus, for example, entry of outside air into the internal space can be restrained effectively.

Application Example 4

In the liquid pressure meter of the application example described above, it is preferable that the hole of the vertically lower has a portion extending in a direction intersecting with a normal line to the pressure sensitive surface from an opening on an outer side of the exterior portion.

Thus, for example, entry of outside air into the internal space can be restrained effectively.

Application Example 5

In the liquid pressure meter of the application example described above, it is preferable that the hole of the vertically lower has a bending portion between an opening on the outer side of the exterior portion and an opening on an inner side of the exterior portion.

Thus, the flow speed of the liquid to be measured that passes through the hole can be restrained. Therefore, for example, generation of convection within the internal space can be restrained. Thus, liquid pressure can be detected more accurately.

Application Example 6

In the liquid pressure meter of the application example described above, it is preferable that the hole of the vertically lower has at least two, the two of holes communicate with each other within a wall of the exterior portion.

Thus, the liquid to be measured can be introduced into the internal space more smoothly. Also, after the internal space is filled with the liquid to be measured, a foreign matter such as gravel can be made to pass through the holes from an outer opening of one hole to an outer opening of the other hole.

Application Example 7

In the liquid pressure meter of the application example described above, it is preferable that the hole of the vertically lower has plural bending portions between an opening on the side of the internal space and an opening on an outer side of the exterior portion.

Thus, the flow speed of the liquid to be measured inside the hole can be lowered further.

Application Example 8

In the liquid pressure meter of the application example described above, it is preferable that the hole of the vertically lower has a diverging portion that diverges into plural branch holes at a point in a course from an opening on an outer side of the exterior portion toward an opening on the side of the internal space, and the bending portion is arranged at the diverging portion and between the diverging portion and the opening on the side of the internal space.

Thus, the flow speed of the liquid to be measured in the hole can be lowered further. Also, the number of outer openings can be reduced while smooth introduction of the liquid to be measured into the internal space can be secured. Therefore, entry of a foreign matter into the internal space can be prevented or restrained effectively.

Application Example 9

In the liquid pressure meter of the application example described above, it is preferable that a depressed portion is arranged in the bending portion.

This depressed portion functions as a storage portion that stores a foreign matter such as gravel entering into the hole. Therefore, entry of the foreign matter into the internal space can be prevented or restrained effectively.

Application Example 10

In the liquid pressure meter of the application example described above, it is preferable that the pressure sensitive portion has a pressure sensitive surface facing the internal space, and an oscillation element that receives a stress corresponding to a displacement of the pressure sensitive surface.

Thus, the configuration of the pressure sensitive portion becomes simpler.

Application Example 11

This application example is directed to a liquid level meter including the liquid pressure meter of the application example described above.

Thus, a liquid level meter that can achieve excellent detection accuracy can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a liquid pressure meter, a liquid level meter and a warning system according to the invention will be described in detail.

1. Liquid Pressure Meter

First, a liquid pressure meter according to the invention will be described.

First Embodiment

Figure 1:
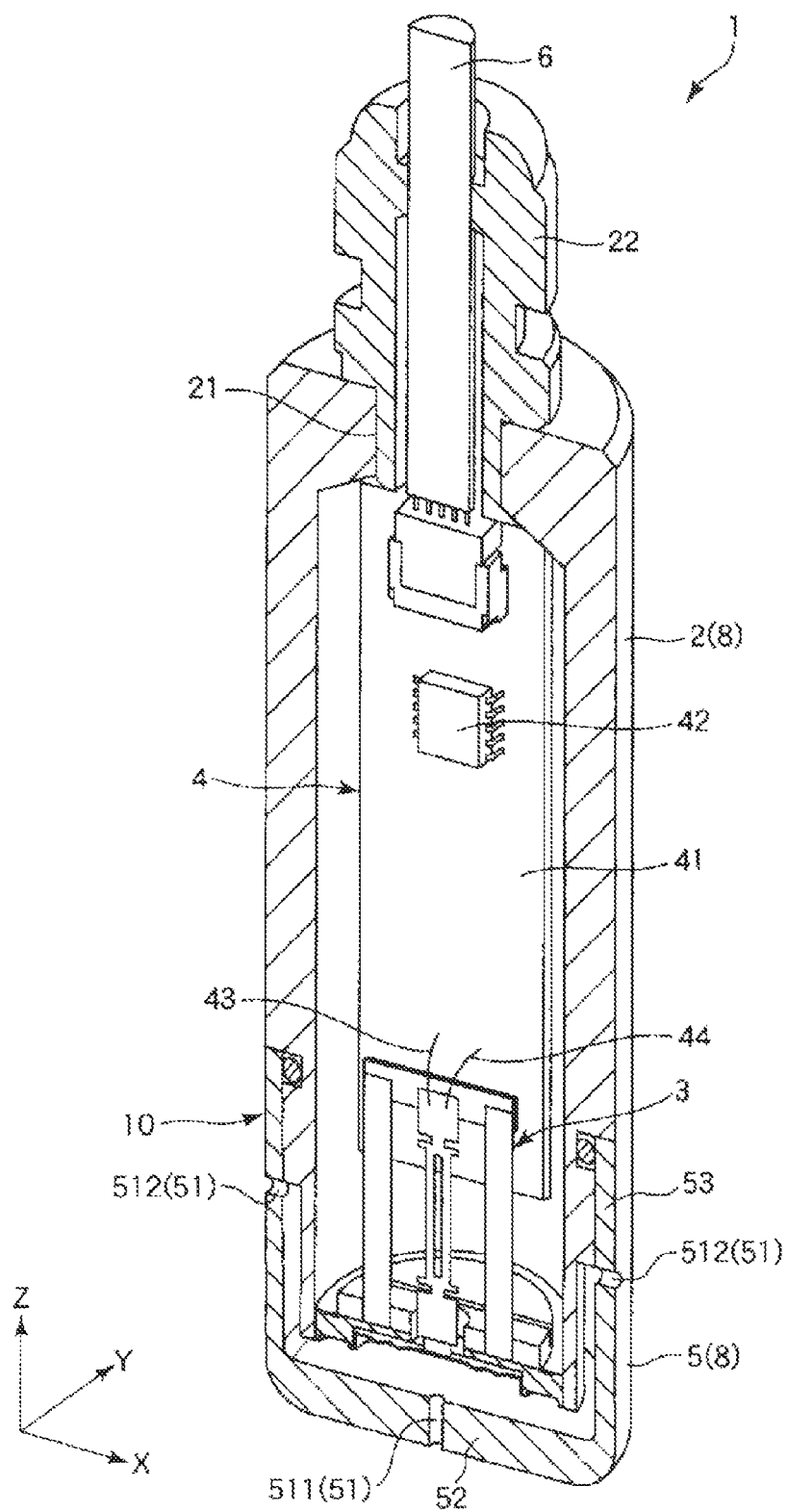
FIG. 1 is a perspective view of a liquid level meter according to a first embodiment of the invention.
Figure 2:
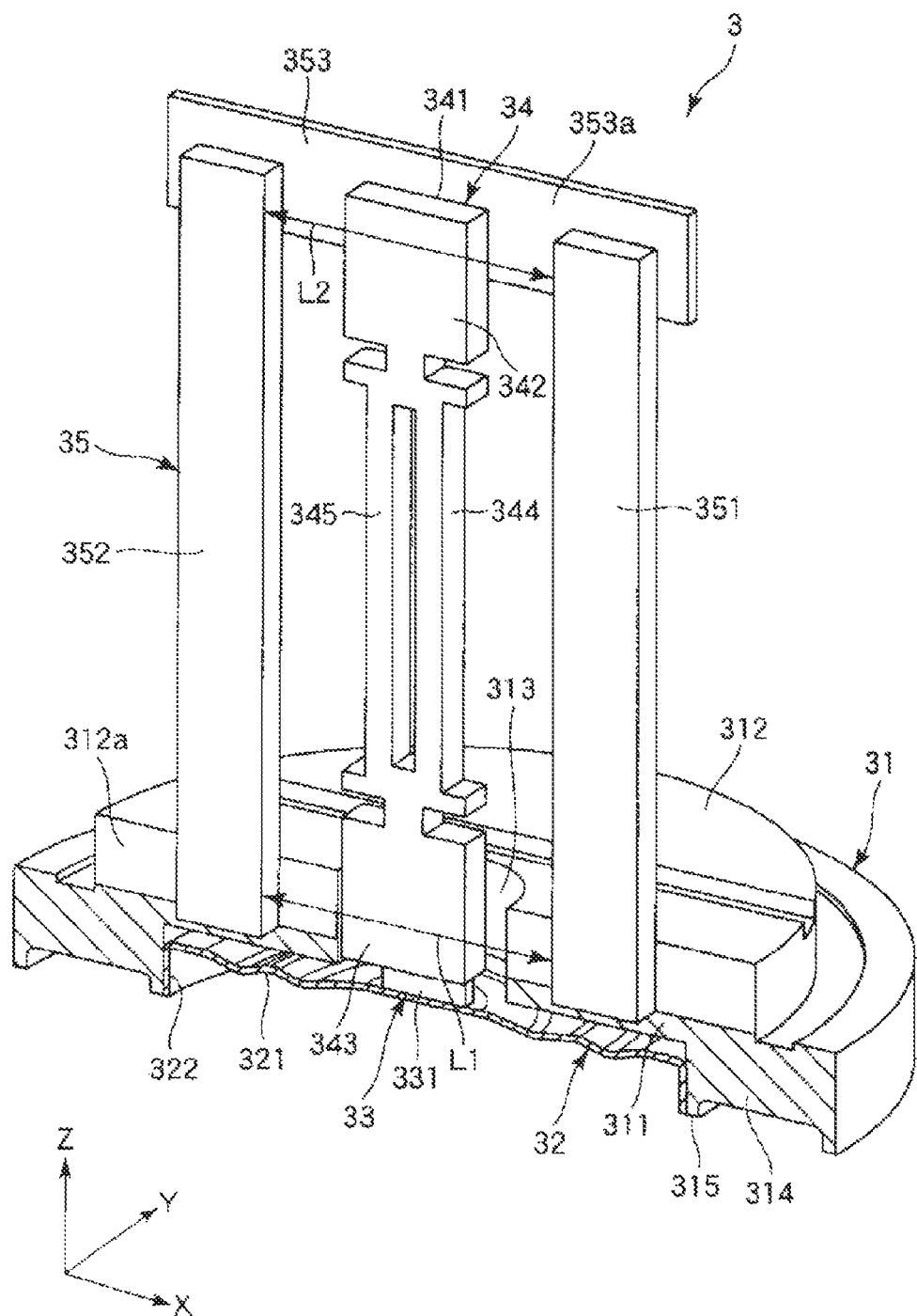
FIG. 2 is a perspective view of a pressure sensitive portion provided in the liquid level meter shown in FIG. 1.
Figure 3:
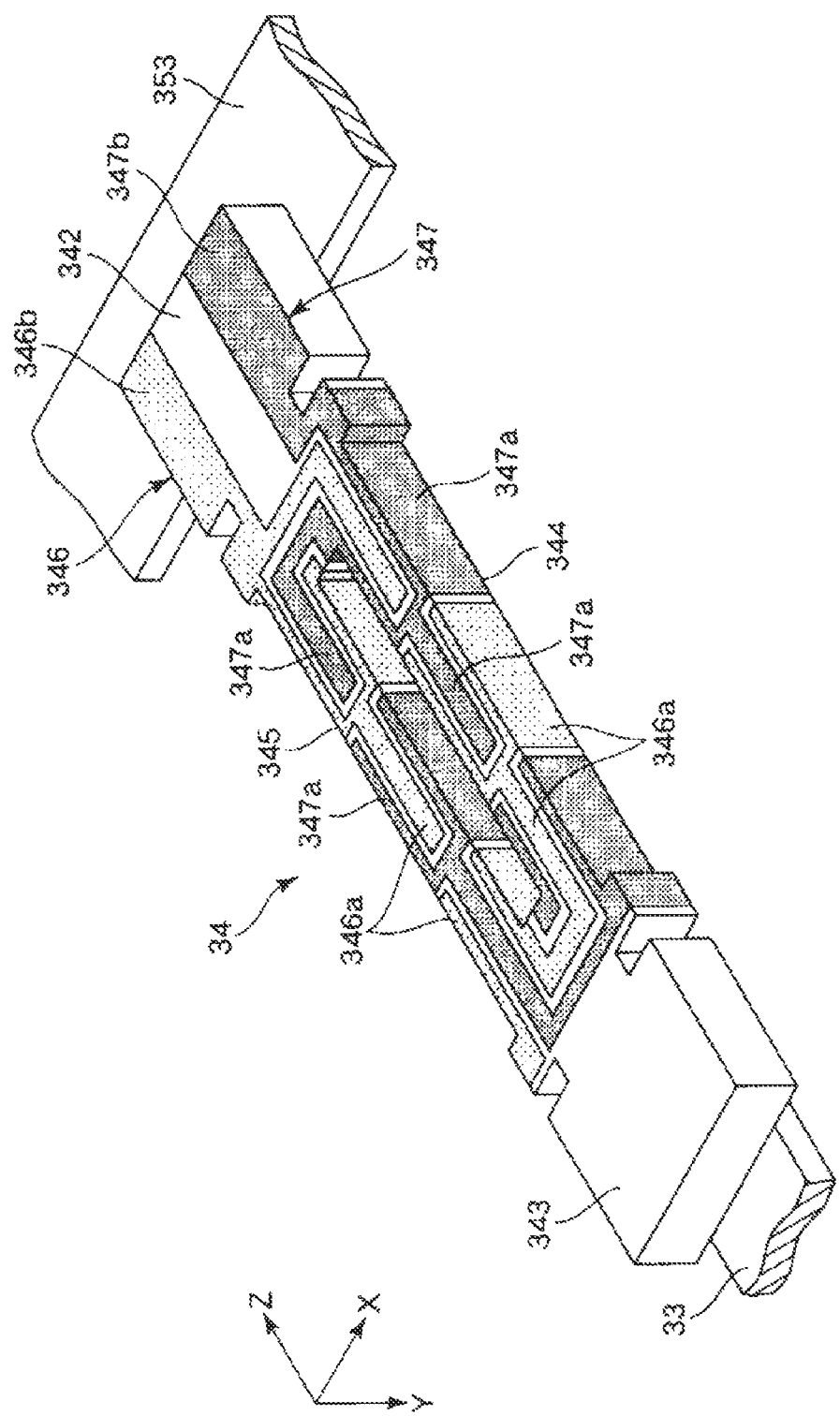
FIG. 3 is a perspective view of a piezoelectric oscillation element provided in the pressure sensitive portion shown in FIG. 2.
Figure 4:
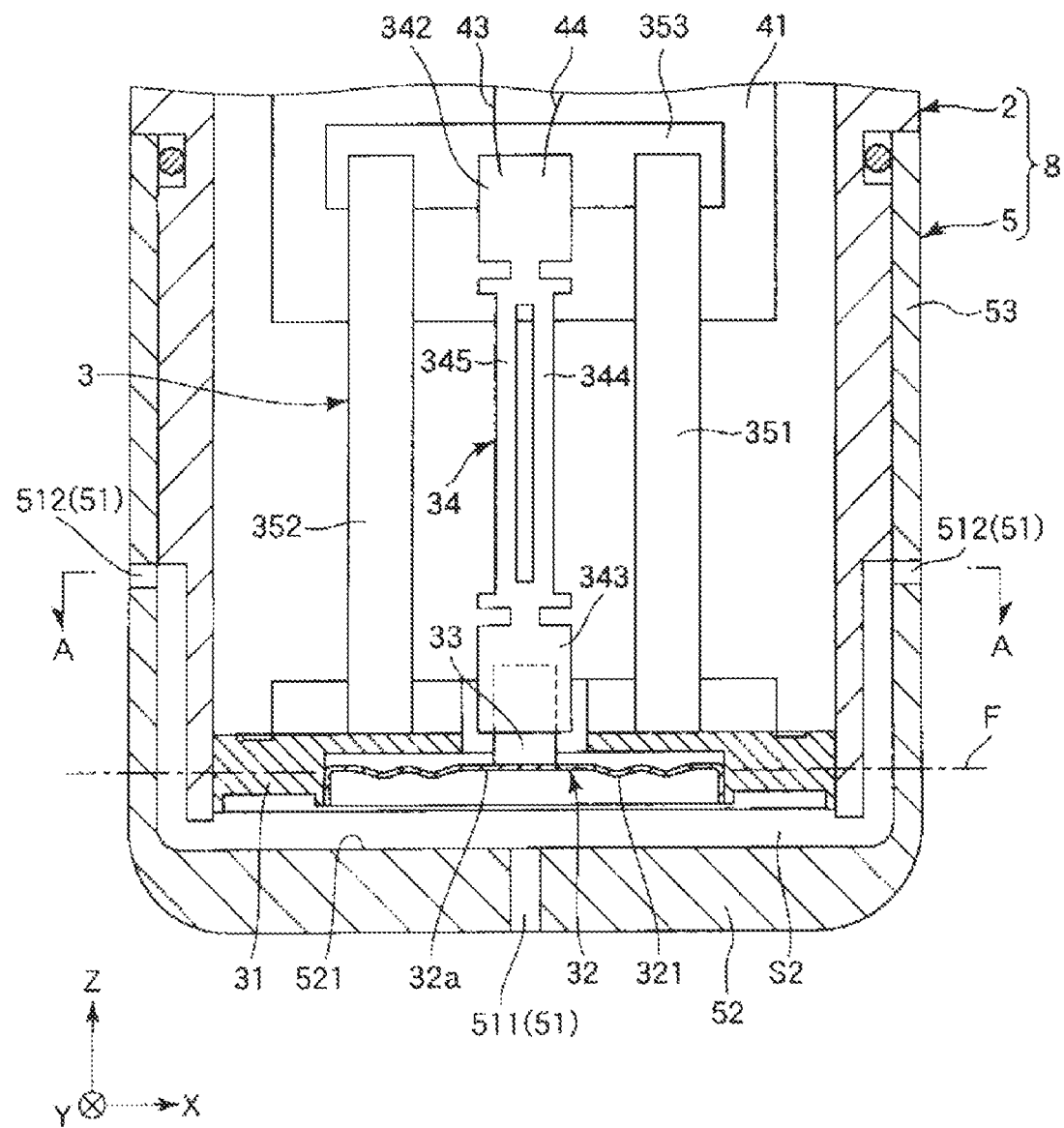
FIG. 4 is a longitudinal sectional view of a cap provided in the liquid level meter shown in FIG. 1.
Figure 5:
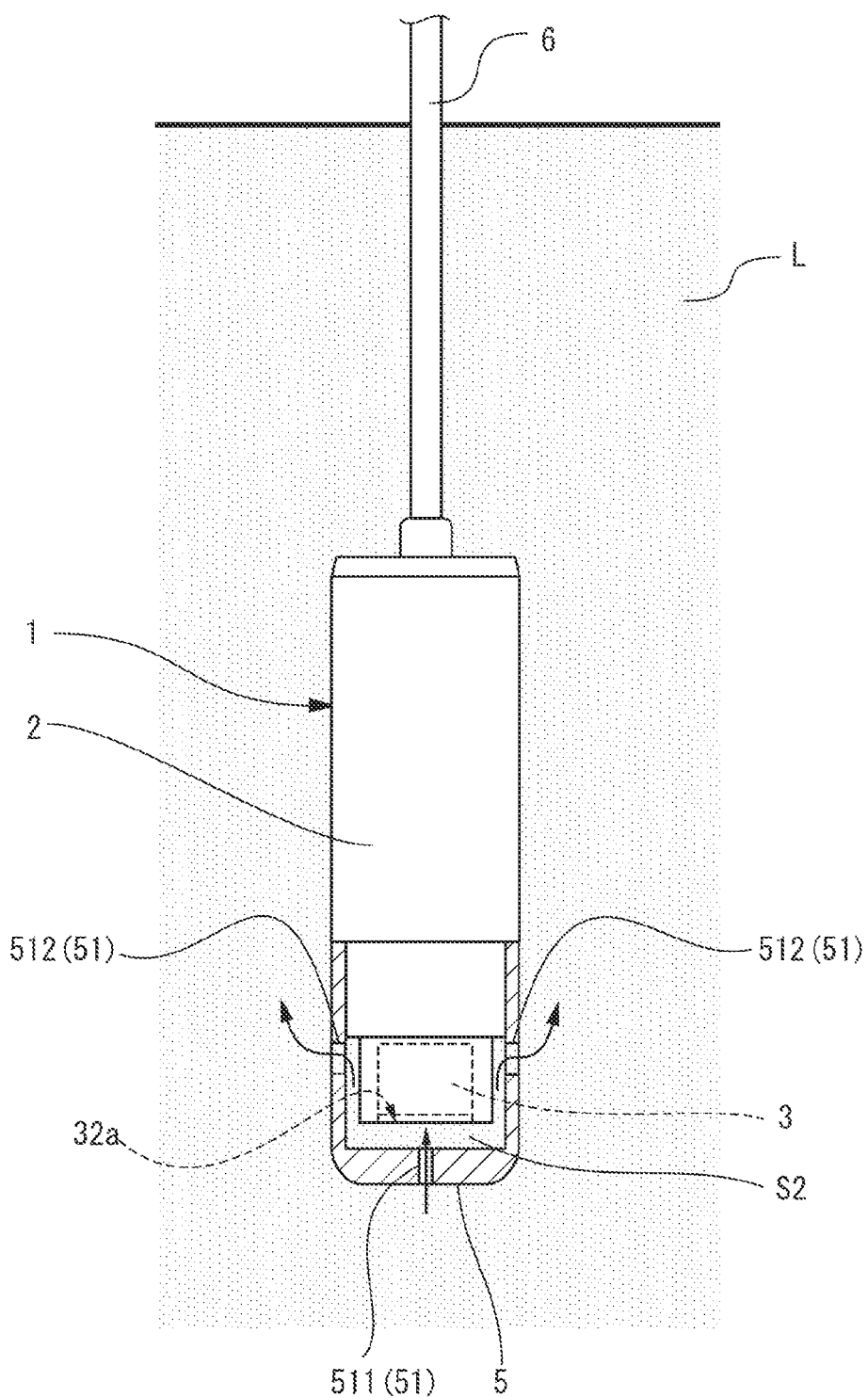
FIG. 5 shows a state of use of the liquid level meter shown in FIG. 1.
Figure 6:
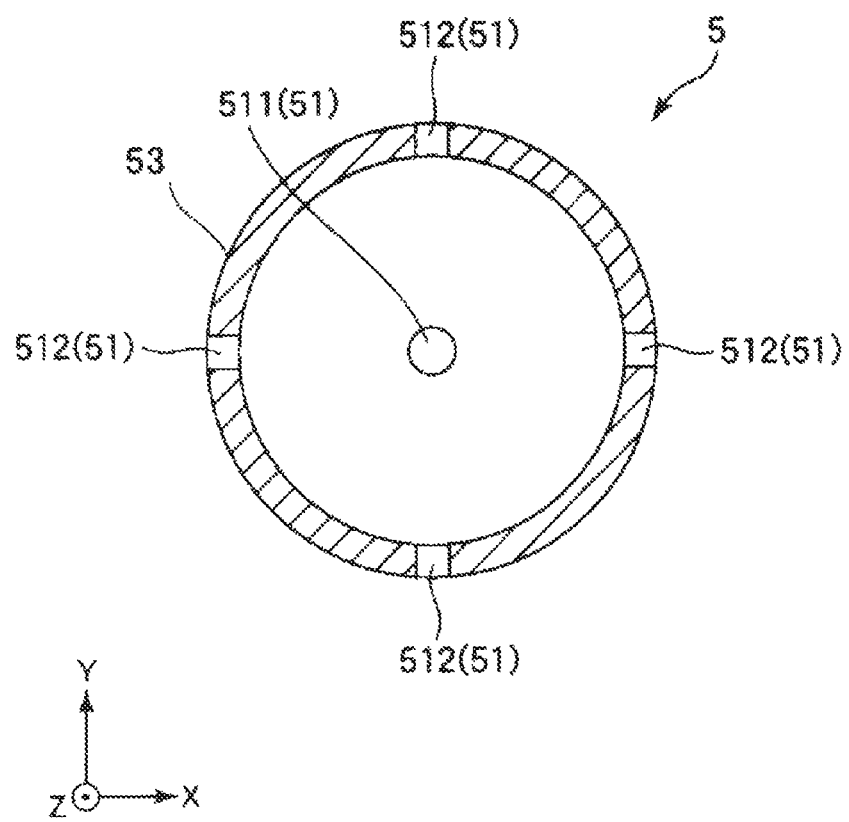
FIG. 6 is a lateral sectional view of the cap provided in the liquid level meter shown in FIG. 1 (section taken along line A-A in FIG. 4).
Figure 7:
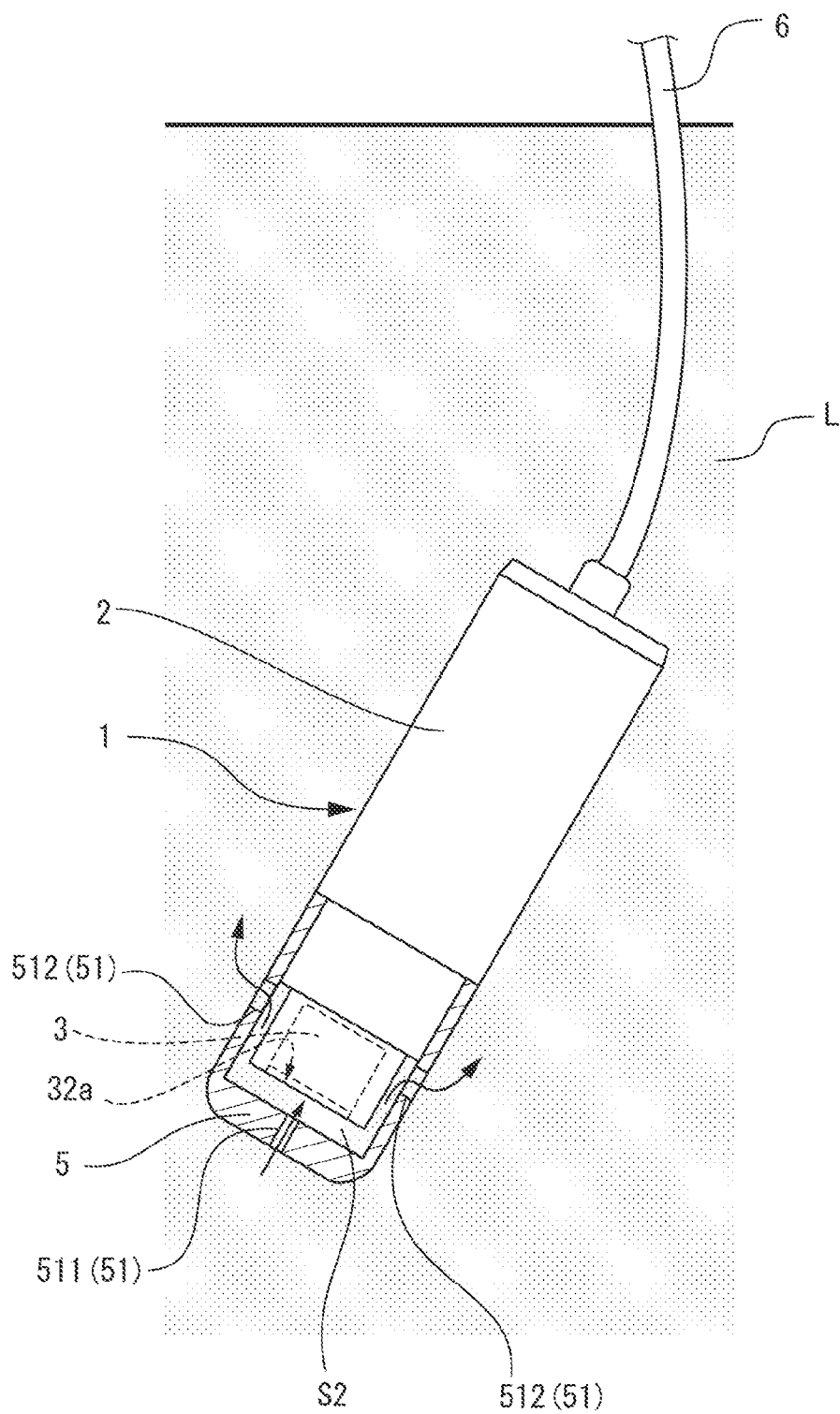
FIG. 7 shows another state of use of the liquid level meter shown in FIG. 1.
Figure 8:
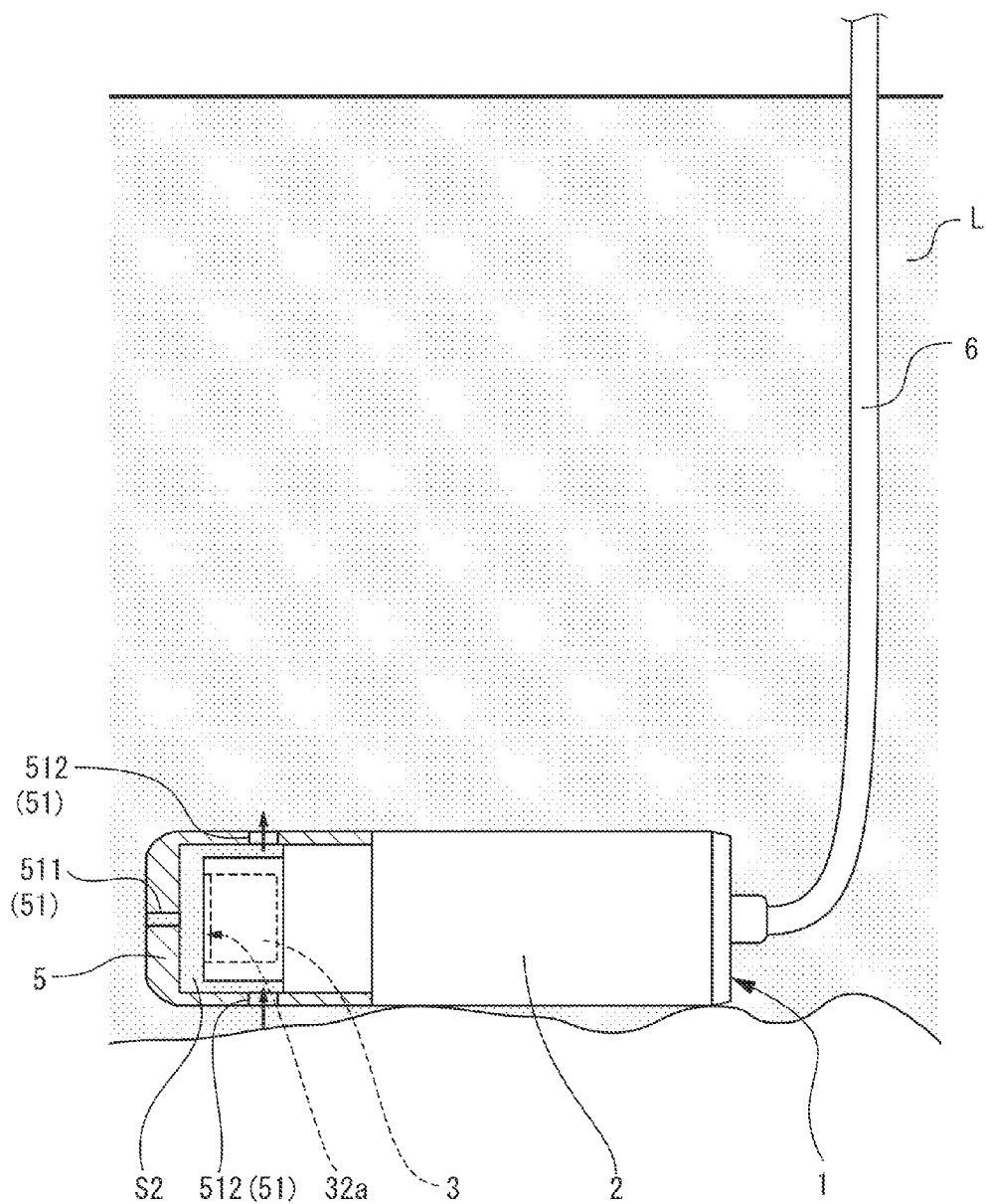
FIG. 8 shows another state of use of the liquid level meter shown in FIG. 1.

FIG. 1 is a perspective view of a liquid level meter according to a first embodiment of the invention. FIG. 2 is a perspective view of a pressure sensitive portion provided in the liquid level meter shown in FIG. 1. FIG. 3 is a perspective view of a piezoelectric oscillation element provided in the pressure sensitive portion shown in FIG. 2. FIG. 4 is a longitudinal sectional view of a cap provided in the liquid level meter shown in FIG. 1. FIG. 5 shows a state of use of the liquid level meter shown in FIG. 1. FIG. 6 is a lateral sectional view of the cap provided in the liquid level meter shown in FIG. 1 (section taken along line A-A in FIG. 4). FIGS. 7 and 8 show other states of use of the liquid level meter shown in FIG. 1. Hereinafter, for convenience of explanation, three axes orthogonal to each other are referred to as an X axis, Y axis, and Z axis, as shown in FIG. 1. Also, directions parallel to the X axis, Y axis, and Z axis are referred to as an X-axis direction, Y-axis direction, and Z-axis direction, respectively. In FIGS. 5, 7 and 8, the lower side of the sheet is regarded as a vertically lower side, whereas the upper side of the sheet is regarded as a vertically upper side.

A liquid level meter 1 shown in FIG. 1 has a housing 2, a pressure sensitive portion 3 and a circuit unit 4 arranged in the housing 2, a cap 5 mounted on the housing 2, and a cable 6 connected to the circuit unit 4 and extending from the housing 2. Of these parts, the housing 2 and the cap 5 form an exterior potion 8 of the liquid level meter 1. This exterior portion 8 and the pressure sensitive portion 3 form a liquid pressure meter (liquid pressure meter according to the invention) 10.

The liquid level meter 1 is arranged for use in a liquid (liquid to be measured) L, for example, an ocean, river, lake, dam (dam lake), reservoir, agricultural water, industrial water or the like, and detects the liquid level based on the liquid pressure applied on the pressure sensitive portion 3. The liquid level meter 1 can also be used as a liquid level detection unit in a broad range of other fields. For example, if the liquid level meter 1 is arranged in a tank of a tanker, the liquid level meter 1 can detect the liquid level of ballast water. Also, the liquid L in which the liquid level meter 1 can be used is not particularly limited. For example, various waters such as seawater and fresh water, and various chemicals such as formaldehyde solution (formalin) and sodium solution can be applied. The viscosity of the liquid L is not particularly limited, either.

Hereinafter, each part constituting the liquid level meter 1 will be described in order.

Housing

As shown in FIG. 1, the housing 2 is in the shape of a cylinder with a closed bottom and has a housing spacing S1 therein for housing and arranging the pressure sensitive portion 3 and the circuit unit 4. In the bottom part of the housing 2, a through-hole 21 for connecting the inside and outside of the housing space S1 and for inserting the cable 6 is formed. A sealing member 22 is provided between the cable 6 and the through-hole 21. The sealing member 22 prevents entry of the liquid L into the housing space S1 from the through-hole 21. The pressure sensitive portion 3 is provided in an opening part of the housing space S1. The pressure sensitive portion 3 liquid-tightly seals the opening of the housing space S1. In this way, in the liquid level meter 1, the housing space S1 is a liquid-tight space (airtight space). The housing space S1 may be in a reduced-pressure state (vacuum) or may be filled with an inert gas such as helium or argon. As the housing space S1 is put in a reduced-pressure state or filled with a gas, the driving of the pressure sensitive portion 3 becomes more stable.

The material to form the housing 2 varies depending on the type of the liquid L as a detection target. However, the material is not particularly limited as long as the material is anticorrosive to the liquid L. Such materials may include, for example, various resin materials such as polyethylene, polypropylene, polyvinyl chloride, polyamide, polyimide, acrylonitrile butadiene styrene copolymer (ABS resin), acrylonitrile styrene copolymer (AS resin), polyether ether ketone (PEEK), polyetherimide, and polyacetal (POM), various metal materials such as iron, nickel, cobalt, copper, aluminum, magnesium, and zinc (including various alloys such as stainless steel, inconel, and duralumin), and various ceramics such as alumina, titania, silicon nitride, aluminum nitride, and titanium nitride.

The length and diameter of the housing 2 are not particularly limited. Depending on the size or the like of the pressure sensitive portion 3, for example, a length of approximately 5 cm or longer and 10 cm or shorter may be preferable, and a diameter of approximately 2 cm or greater and 5 cm or smaller may be preferable. By employing these ranges of sizes, the liquid level meter 1 can be reduced in size. Also, for example, a very convenient liquid level meter 1 that can be inserted in a narrow tube can be realized.

Pressure Sensitive Portion

As shown in FIG. 2, the pressure sensitive portion 3 has a holding member 31, a diaphragm (pressure receiving portion) 32, a fixing member 33, a piezoelectric oscillation element (pressure sensitive element) 34, and a supporting member 35. Since the pressure sensitive portion 3 uses the diaphragm 32 and the piezoelectric oscillation element 34, the pressure sensitive portion 3 has a simple configuration and can achieve excellent detection accuracy.

Holding Member

The holding member 31 has a plate-like base portion 311, a protruding portion 312 protruding from a central part excluding an edge part of an upper surface of the base portion 311, a through-hole 313 penetrating the central part of the base portion 311 and the protruding portion 312, an annular sidewall portion 314 erected on an edge part of a lower surface of the base portion 311, and a circular projection 315 erected on a lower surface of the sidewall portion 314. Such a holding member 31 has an outer peripheral surface joined liquid-tightly to an inner peripheral surface of the opening part of the housing 2. The joining method is not particularly limited as long as liquid-tight joining can be done. For example, welding, or a method using a brazing filler, adhesive or the like may be employed.

On an upper surface of the protruding portion 312, a groove 312a with a closed bottom is formed. The groove 312a is provided to overlap the through-hole 313. A lateral side of the groove 312a is formed by a surface parallel to the Z axis (XZ plane) and functions as a fixing portion to fix the supporting member 35, as described later.

The projection 315 is formed in such a way that an inner peripheral surface thereof continues to an inner peripheral surface of the sidewall portion 314. The projection 315 is a part welded to the diaphragm 32, as described later, and therefore is formed to a thin thickness, thus restraining the amount of heat required for the welding. The width (thickness) and height of the projection 315 varies depending on the size of the diaphragm 32. However, for example, a width of approximately 0.1 mm or greater and 1 mm or smaller is preferable, and a height of approximately 0.1 mm or greater and 2 mm or smaller is preferable. Employing such a width and height, the amount of heat required for the welding between the projection 315 and the diaphragm 32 can be restrained sufficiently. Residual stress tends to be greater as the amount of heat in the welding becomes larger. Therefore, by restraining the amount of heat in the welding as described above, the residual stress in the pressure sensitive portion 3 can be restrained and a fall in the pressure sensing accuracy of the pressure sensitive portion 3 can be restrained.

The material to form the holding member 31 is not particularly limited. However, for example, a highly anti-corrosive material is preferable. Such materials may include, for example, metal materials such as stainless steel, and various ceramics such as alumina, titania, silicon nitride, aluminum nitride, and titanium nitride. As a material to form the holding member 31, it is preferable to use a material having the same or similar coefficient of thermal expansion to the material of the diaphragm 32. Moreover, it is preferable to use a material having the same or similar coefficient of thermal expansion to the material of a beam member 353, later described, of the supporting member 35. This can reduce the difference in thermal expansion between the individual parts and prevent or restrain heat strain of the diaphragm 32.

Diaphragm

As shown in FIGS. 1 and 2, the diaphragm 32 is provided to face (be exposed) outside the housing 2. Such a diaphragm 32 has a displacement portion (pressure receiving portion) 321 that becomes displaced in the Z-axis direction by receiving an external pressure, and an outer peripheral portion 322 protruding downward from an edge of the displacement portion 321. The displacement portion 321 is arranged away from the base portion 311 of the holding member 31 in the Z-axis direction. An out peripheral part of the displacement portion 321 is formed in an undulating shape and thus made flexibly deformable so that a central part of a flat plate thereof can be displaced in the Z-axis direction (direction of thickness).

On the other hand, the outer peripheral portion 322 is a site welded to the projection 315 of the holding member 31. With the provision of such an outer peripheral portion 322, the rigidity of the diaphragm 32 can be increased and unintended deformation of the diaphragm 32 can be prevented or restrained. Also, a sufficient joining area can be secured between the diaphragm 32 and the holding member 31. Particularly, it is preferable that the outer peripheral portion 322 is formed to a thin thickness. Thus, the diaphragm 32 and the holding member 31 can be welded together with a relatively small amount of heat. Also, the outer peripheral portion 322 is joined liquid-tightly to the projection 315, in the entire circumferential area on the outer circumference thereof. Thus, entry of the liquid into the housing space S1 via a gap between the diaphragm 32 and the holding member 31 and via the through-hole 313 is prevented.

As the thickness of the diaphragm 32 (the displacement portion 321 and the outer peripheral portion 322), approximately 0.1 mm or greater and 2 mm or smaller is preferable, and approximately 0.1 mm or greater and 1 mm or smaller is more preferable. Thus, the displacement portion 321 becomes sufficiently displaceable, and sufficient joining strength to the holding member 31 can be secured. Moreover, in view of manufacturability, it is preferable that the displacement portion 321 and the outer peripheral portion 322 have an equal thickness to each other. If the thickness of the diaphragm 32 is less than the above lower limit, the mechanical strength of the diaphragm 32 and the joining strength to the holding member 31 may fall, for example, depending on the size, material and the like of the diaphragm 32. On the other hand, if the thickness of the diaphragm 32 exceeds the above upper limit, the diaphragm 32 may become less deformable and the pressure receiving sensitivity lowers, depending on the size, material and the like of the diaphragm 32. Therefore, the amount of heat in welding the holding member 31 and the diaphragm 32 together may increase, and the residual stress generated in the diaphragm may increase.

The material to form such a diaphragm 32 is not particularly limited. However, a highly anticorrosive material is preferable. Such materials may include, for example, metal materials such as stainless steel, various ceramics such as alumina, titania, silicon nitride, aluminum nitride, or titanium nitride, and single crystals such as quartz or silicon (Si). Even a material with poor anticorrosiveness can be used as a material to form the diaphragm 32 if various kinds of plating are performed on the surface of the material to provide anticorrosiveness. If any of the above metal materials is used to form the diaphragm 32, the diaphragm 32 can be easily formed by pressing a sheet of the metal. If any of the above single crystals is used to form the diaphragm 32, the diaphragm 32 can be easily formed by etching the single crystal (wet etching or drying etching).

Fixing Member

The fixing member 33 is joined (fixed) to the central part of the displacement portion 321 of the diaphragm 32. Therefore, the fixing member 33 is displaced in the Z-axis direction with the displacement of the displacement portion 321. The fixing member 33 is arranged in the state of being inserted in the through-hole 313 of the holding member 31. The fixing member 33 has a fixing surface (XZ plane) 331 parallel to the Z axis, and a lower end of the piezoelectric oscillation element 34 is joined to this fixing surface 331.

The material to form such a fixing member 33 is not particularly limited. However, in view of heat strain, for example, it is preferable to use a material having the same or similar coefficient of thermal expansion to the material of the diaphragm 32.

Supporting Member

The supporting member 35 has a pair of pole members 351, 352 extending in the Z-axis direction, and a beam member 353. Each of the pole members 351, 352 is in the shape of a long plate extending in the Z-axis direction and a lower end thereof is joined to the lateral surface (XZ plane) of the groove 312a. The pole members 351, 352 are arranged opposite to each other in the X-axis direction with the through-hole 313 in-between. The pole members 351, 352 are situated on the inner side of the displacement portion 321, as viewed in an XY plan view (as viewed in a plan view seen from the direction of displacement of the displacement portion 321). Meanwhile, the beam member 353 is in the shape of a long plate extending in the X-axis direction and connects upper ends of the pole members 351, 352 to each other. In other words, the beam member 353 has one end joined to the upper end of the pole member 351 and has the other end joined to the upper end of the pole member 352. A separation length L1 between the joining parts between the pole members 351, 352 and the lateral side of the groove 312a is substantially equal to a separation length L2 between the joining parts thereof to the beam member 353. One main surface (XZ plane) 353a of the beam member 353 is away from the fixing surface 331 of the fixing member 33 in the Z-axis direction and situated within the same plane. An upper end of the piezoelectric oscillation element 34 is joined to a central part of the one main surface 353a.

As described above, as the pole members 351, 352 are situated on the inner side of the displacement portion 321, as viewed in an XY plan view, excessive outward protrusion of the pole members 351, 352 can be restrained and the pressure sensitive portion 3 can be reduced in size. Also, the length of the beam member 353 can be reduced by the amount of the reduction in the separation length between the pole members 351, 352. Therefore, the rigidity of the beam member 353 increases and flexure of the beam member 353 in the Z-axis direction can be restrained. As a result, cancelation, by the flexure of the beam member 353, of the tension applied to the piezoelectric oscillation element 34 by the displacement of the displacement portion 321 can be effectively restrained, and the pressure sensitive portion 3 can achieve excellent pressure receiving sensitivity.

The length of the pole members 351, 352 is not particular limited. However, a length at which the amount of thermal expansion of the pole members 351, 352 becomes equal to the amount of thermal expansion of the piezoelectric oscillation element 34 is preferable. Thus, heat strain of the piezoelectric oscillation element 34 can be prevented or restrained effectively and the pressure sensitive portion 3 has excellent pressure sensing accuracy.

The material to form the pole members 351, 352 is not particularly limited. However, a material having the same or similar coefficient of thermal expansion to the material forming a piezoelectric substrate 341, later described, of piezoelectric oscillation element 34 is preferable, and the same material as the material forming the piezoelectric substrate 341 is more preferable. In this way, when a material having the same or similar coefficient of thermal expansion to the material forming the piezoelectric substrate 341 is used as the material to form the pole members 351, 352, the amounts of thermal expansion of the pole members 351, 352 and of the piezoelectric oscillation element 34 can be made equal, as described above, relatively easily by forming the pole members 351, 352 and the piezoelectric oscillation element 34 to the same length.

Meanwhile, the material to form the beam member 353 is not particularly limited, but a material having the same or similar coefficient of thermal expansion to the material forming the holding member 31 or the diaphragm 32 is preferable. Since the separation lengths L1, L2 are set to be equal, as described above, heat strain of the beam member 353, the holding member 31 or the diaphragm 32 is restrained by forming the beam member 353 with a material as described above. As a result, heat strain of the piezoelectric oscillation element 34 via these members can be prevented or restrained effectively.

Piezoelectric Oscillation Element

As shown in FIGS. 2 and 3, the piezoelectric oscillation element 34 has a piezoelectric substrate 341, and a pair of excitation electrodes 346, 347 formed on the piezoelectric substrate 341.

The piezoelectric substrate 341 has a pair of base portions 342, 343 arranged away from each other in the Z-axis direction, and a pair of oscillation arms 344, 345 provided between the base portions 342, 343 and connecting these base portions. Of the base portions 342, 343, the base portion 342 situated on the upper side is joined to the main surface 353a of the beam portion 353, as described above, and the base portion 343 situated on the lower side is joined to the fixing surface 331 of the fixing member 33, as described above. Each of the oscillation arms 344, 345 is in the shape of a bar extending in the Z-axis direction. Upper ends of these oscillation arms are connected to the base portion 343 and lower ends thereof are connected to the base portion 343. The oscillation arms 344, 345 are provided side by side in the X-axis direction.

As the material to form such a piezoelectric substrate 341, for example, various piezoelectric materials such as quartz, lithium niobate, and lithium tantalate can be used. Of these materials, it is preferable to use quartz as the material to form the piezoelectric substrate 341. By forming the piezoelectric substrate 341 with quartz, the piezoelectric oscillation element 34 has an excellent temperature characteristic, compared with the cases where other materials are used.

As shown in FIG. 3, the excitation electrode 346 has plural electrode pieces 346a formed on the oscillation arms 344, 345, and a terminal electrode 346b formed on the base portion 342 and electrically connected to each electrode piece 346a. Similarly, the excitation electrode 347 has plural electrode pieces 347a formed on the oscillation arms 344, 345, and a terminal electrode 347b formed on the base portion 342 and electrically connected to each electrode piece 347a.

The electrode pieces 346a, 347a are formed in such a way that these electrode pieces are situated alternately in each of the longitudinal direction and circumferential direction of the oscillation arms 344, 345, and in such a way that the arrangements of these electrode pieces are reversed between the oscillation arm 344 and the oscillation arm 345. Three electrode pieces 346a, 347a in total are formed alternately along the longitudinal direction of the oscillation arms 344, 345. In other words, each of the oscillation arms 344, 345 has three oscillation areas arrayed in the longitudinal direction and the electrode pieces 346a, 347a are formed in each oscillation area. As the three oscillation areas are thus formed in the oscillation arms 344, 345, the oscillation arms 344, 345 can be oscillated more efficiently. Therefore, the pressure sensitive portion 3 can achieve excellent pressure receiving sensitivity.

The configuration of such excitation electrodes 346, 347 is not particularly limited. However, for example, a multi-layer structure in which an electrode layer made of Au (gold), Ag (silver), Cu (copper) or the like is stacked on an underlying layer made of Ni (nickel), Cr (chromium) or the like, is preferable. With such a configuration, the excitation electrodes 346, 347 having excellent contactability to the piezoelectric substrate 341 and having excellent conductivity can be formed.

Up to this point, the configuration of the piezoelectric oscillation element 34 is described. In such a piezoelectric oscillation element 34, when an alternating voltage is applied between the excitation electrodes 346, 347, the oscillation arms 344, 345 perform in-plane oscillation (oscillation in XZ plane) at a unique resonance frequency so as to repeat moving toward and away from each other. Here, as described above, the base portion 343 is fixed to the fixing member 33 that becomes displaced in the Z-axis direction with the displacement portion 321 of the diaphragm 32. Therefore, when the displacement portion 321 becomes displaced in the Z-axis direction, a compressive stress or tensile stress is applied to the oscillation arms 344, 345 and the resonance frequency of the oscillation arms 344, 345 changes according to the applied stress. Specifically, if the displacement portion 321 becomes displaced in the +Z-axis direction, a compressive stress is applied to the oscillation arms 344, 345 and the resonance frequency of the oscillation arms 344, 345 decreases. On the other hand, if the displacement portion 321 becomes displaced in the −Z-axis direction, a tensile stress (extensible stress) is applied to the oscillation arms 344, 345 and the resonance frequency of the oscillation arms 344, 345 increases. Therefore, based on the change in the resonance frequency of the oscillation arms 344, 345, the pressure (liquid pressure) received by the diaphragm 32 can be detected. Particularly in this embodiment, a double tuning fork oscillation element is used as the piezoelectric oscillation element 34, and this double tuning fork oscillation element has a greater amount of change in the resonance frequency to a tensile or compressive stress and a greater variance range of the resonance frequency than a thickness slip oscillation element such as an AT-cut oscillation element. Therefore, the pressure sensitive portion 3 has excellent resolution, compared with the case where a piezoelectric oscillation element of a different configuration is used.

In this embodiment, the piezoelectric oscillation element has two oscillation arms. However, the number of oscillation arms is not particularly limited and may be one, or three or more. Also, while the piezoelectric oscillation element in this embodiment is a double tuning fork oscillation element, the configuration thereof is not particularly limited as long as the resonance frequency changes according to the received stress. For example, a thickness slip oscillation element such as an AT-cut oscillation element or BT-cut oscillation element, or a SAW (surface acoustic wave) resonator may be used instead of a double tuning fork oscillation element. Particularly, an AT-cut oscillation element has a frequency characteristic in the form of a cubic curve and therefore serves as a piezoelectric oscillation element having a higher temperature characteristic than a double tuning fork oscillation element having a frequency characteristic in the form of a quadratic curve. Also, if a SAW resonator is used, it suffices to form an IDT (comb-teeth electrode) or reflector only on one main surface of the piezoelectric substrate. Therefore, the manufacturing cost of the piezoelectric oscillation element can be reduced, compared with a double tuning fork oscillation element, a thickness slip oscillation element and the like.

Circuit Board

As shown in FIG. 1, the circuit unit 4 has a circuit board 41, and an IC chip 42 arranged on the circuit board 41. The circuit board 41 is fixed to an inner peripheral surface of the housing 2 with an adhesive or the like, not shown. The circuit board 41 is electrically connected to the terminal electrodes 346b, 347b of the piezoelectric oscillation element 34 with metal wires 43, 44. Such a circuit unit 4 has the function of applying an alternating voltage between the excitation electrodes 346, 347 to excite oscillation of the piezoelectric oscillation element 34, and the function of detecting the liquid pressure received by the diaphragm 32, based on an output (resonance frequency) from the piezoelectric oscillation element 34.

Cable

The cable 6 is drawn from the inside to the outside of the housing 2 via the through-hole 21. One end of such a cable 6 (an end situated on the inner side of the housing 2) is electrically connected to the circuit unit 4. At the other end of the cable 6, for example, a connector is provided, though not shown. If this connector is connected to an external device (for example, a computer), not shown, the result of detection by the liquid level meter 1 can be acquired at the external device.

Cap

As shown in FIG. 4, the cap 5 is mounted on the housing 2 in such a way as to cover the diaphragm 32 exposed from the housing 2. The cap 5 is in the shape of a cylinder with a closed bottom, and has a bottom portion 52 and a frame-like (annular) sidewall portion 53 erected from an edge of the bottom portion 52. Such a cap 5 may be removably mounted, for example, by a method such as screwing or fitting, or may be mounted in an unremovable manner by a method such as pressing-in or fixing.

In the state where the cap 5 is mounted on the housing 2, an internal space S2 in which the liquid L enters is formed between the inner surface of the cap 5 and the diaphragm 32 and between the inner surface of the cap 5 and a lower-end lateral surface of the housing. In other words, the exterior portion 8 has the internal space S2 in which the liquid L enters. The diaphragm 32 is provided in such a way as to be exposed to (face) this internal space S2. Also, plural holes 51 connecting the inside and outside of the internal space S2 are formed in the cap 5. These plural holes 51 include at least one introduction hole for introducing the liquid L into the internal space S2 and at least one discharge hole for discharging air and the liquid L from the internal space S2.

The plural holes 51 include a first hole 511 situated below (on one side from) the plane F including the pressure sensitive surface (the surface of the displacement portion 321 contacting the liquid L) 32a of the diaphragm 32, and plural second holes 512 situated above (on the other side from) the plane F. In other words, in the cap 5, at least one hole 51 is formed on each of the two sides from the plane F (intersecting with the plane F), as viewed in a plan view seen from a direction (for example, the Y-axis direction as shown in FIG. 4) orthogonal to the Z axis (the direction of thickness of the diaphragm 32). Here, the plane F refers to an XY plane intersecting with the upper end of the pressure sensitive surface 32a (a surface parallel to the diaphragm 32). The position of each hole 51 is determined, using the lower end of the opening on the side of the internal space S2 (a portion situated on the lowest side in FIG. 4) as a reference.

In this way, as at least one hole 51 is situated on each of the two sides from the plane F, the air in the internal space S2, particularly, the air around the pressure sensitive surface 32a, can be discharged effectively. Therefore, the liquid pressure can be detected accurately. This effect will be described specifically below.

FIG. 5 shows an example of the state of use of the liquid level meter 1. In FIG. 5, the lower side of the sheet is the vertically lower side, and the upper side of the sheet is the vertically upper side. In this way, the liquid level meter 1 is arranged for use in the liquid L, with the cap 5 facing the vertically lower side. In this state, of the plural holes 51, the first hole 511 situated on the vertically lower side from the plane F functions as an introduction hole to introduce the liquid L into the internal space S2, and the plural second holes 512 situated on the vertically upper side from the plane F function as discharge holes to discharge the air from the internal space S2. That is, when the liquid level meter 1 is placed in the liquid L, the liquid L is introduced into the internal space S2 from the first hole 511, and the air is discharged from the plural second holes 512. As a result, the internal space S2 is substantially filled with the liquid L. By detecting the resonance frequency of the piezoelectric oscillation element 34 in this state, the liquid level of the liquid L can be detected accurately.

If the air inside the internal space S2 cannot be discharged sufficiently and the air remains in the internal space S2 (hereinafter, this air is referred to as "residual air"), the residual air contacts the pressure sensitive surface 32a, causing problems such as (1) that the liquid pressure applied to the pressure sensitive surface 32a deviates from the liquid pressure that should be applied originally, due to the residual air, (2) that the liquid pressure applied to the pressure sensitive surface 32a largely fluctuates, due to the residual air, and the output (resonance frequency) from the piezoelectric oscillation element 34 becomes unstable, and (3) that the output (resonance frequency) from the piezoelectric oscillation element 34 changes, due to the residual air and the temperature difference of the liquid L. Therefore, if the residual air exists, the liquid level cannot be detected accurately.

As shown in FIG. 6, four second holes 512 are formed in the sidewall portion 53 of the cap. The four second holes 512 are formed away from each other with an equal spacing along the circumferential direction of the sidewall portion 53. Therefore, it can be said that, in the cap 5, at least one hole 51 is formed on each of the two sides of the pressure sensitive surface 32a in a direction parallel to the plane F (in the in-plane direction of the XY plane). By thus forming plural second holes 512 along the circumferential direction of the cap 5, the air inside the internal space S2 can be discharged efficiently. Also, as described later, an excellent detection characteristic can be achieved in any attitude, without being affected by the attitude of the liquid level meter 1. The number of second holes 512 is not limited to four and may be three or less, or five or more.

The diameter (maximum width) of each second hole 512 is not particularly limited. However, approximately 3 mm or greater and 5 mm or smaller is preferable, and approximately 4 mm is preferable. Using such a size, the air can be smoothly discharged from the internal space S2 via the second holes 512. Though the diameter of each second hole 512 depends on the number of second holes 512, it is preferable that the diameter of each second hole 512 is greater than the diameter of the first hole 511. Thus, the capability to discharge the air from the internal space S2 (the maximum amount of discharge per unit time) can be made greater than the capability to introduce the liquid L into the internal space S2 (the maximum amount of introduction per unit time). Therefore, the liquid L can be introduced into the internal space S2 more smoothly.

Meanwhile, the one first hole 511 is formed in the bottom portion 52 of the cap 5. By thus reducing the number of first holes 511, the amount of the liquid L supplied into the internal space S2 (amount of supply per unit time) can be restrained to a low level. Therefore, generation of convection and air bubbles in the internal space S2 can be restrained effectively. Also, since the liquid L is introduced into the internal space S2 through the one first hole 511, for example, when the liquid level meter is used in an ocean or river, a liquid L having a temperature difference (for example, a liquid L included in a different tidal current) can be prevented from being introduced simultaneously into the internal space S2. Thus, a sudden temperature change in the liquid L in the internal space S2 is restrained and a stable and accurate output (resonance frequency) is provided from the piezoelectric oscillation element 34.

The diameter (maximum width) of each first hole 511 is not particularly limited. However, approximately 1 mm or greater and 3 mm or smaller is preferable, and approximately 2 mm is preferable. Using such a size, the liquid L can be introduced smoothly into the internal space S2 while entry of a foreign matter into the internal space S2 can be restrained.

The first hole 511 is formed along the center axis of the liquid level meter 1 and situated to overlap a central part of the pressure sensitive surface 32a, as viewed in a plan view of the pressure sensitive surface 32a. As the first hole 511 is arranged in this way, the internal space S2 can be uniformly filled with the liquid L without any disparity.

The number of first holes 511 is not limited to one and may be two or more. The first hole 511 may be a hole that diverges into branches in the middle. Also, while the first hole 511 is formed along the center axis of the liquid level meter 1 in this embodiment, the position to form the first hole 511 is not limited to this example and may be shifted from the center axis.

In the cap 5, a bottom surface (inner surface of the bottom portion 52) 521 faces the diaphragm 32 and is substantially parallel to the diaphragm 32. The separation length between the bottom surface 521 and the diaphragm 32 (plane F) is not particularly limited. However, for example, approximately 0.5 mm or longer and 5.0 mm or shorter is preferable, and approximately 0.5 mm or longer and 3.0 mm or shorter is more preferable. Using such a separation length, the air present between the bottom surface 521 and the diaphragm 32 can be securely discharged from the internal space S2 on introducing the liquid L into the internal space S2, and the volume of the liquid L filling the space between the diaphragm 32 and the bottom surface 521 can be restrained. Therefore, for example, generation of convection of the liquid L in the internal space S2 can be restrained effectively. Thus, the liquid level meter 1 can obtain a stable and accurate output from the piezoelectric oscillation element 34 and can detect the liquid level more accurately.

Up to this point, the liquid level meter 1 is described. As described above, the liquid level meter 1 is configured in such a way that, in the state of use shown in FIG. 5, at least one hole 51 is situated on each of the vertically lower side and the vertically upper side from the pressure sensitive surface 32a. Here, the inventors recommend the state of use shown in FIG. 5, as a state of use of the liquid level meter 1. However, there is a risk that the liquid level meter 1 may be used in different states, depending on the environment where the liquid level meter 1 is used, and the user's misrecognition or the like. Therefore, the liquid level meter 1 is configured to meet the above conditions even in other states than the state of use shown in FIG. 5. Thus, in the liquid level meter 1, generation of residual air can be restrained and an excellent detection characteristic can be achieved, irrespective of the attitude of the liquid level meter 1.

Specifically, for example, in the case where a flow of the liquid L is generated, as in a river or ocean, the liquid level meter 1 may follow the flow of the liquid L and become inclined, as shown in FIG. 7. Also, if the user does not correctly understand the method of use, the case where the liquid level meter 1 is used as it is laid down on the seafloor, as shown in FIG. 8, can be considered. In the liquid level meter 1 of this embodiment, plural second holes 512 are formed along the circumferential direction of the cap 5 so that at least one hole 51 is situated on each of the vertically lower side and the vertically upper side from the pressure sensitive surface 32a even in such states of use.

In the state of use shown in FIG. 7, of the plural second holes 512, the second hole 512 situated on the left-hand side in FIG. 7 is situated on the vertically upper side from the pressure sensitive surface 32a, and each first hole 511 is situated on the vertically lower side from the pressure sensitive surface 32a. In this way, in the liquid level meter 1, even in the inclined state, at least one hole 51 is situated on each of the vertically lower side and the vertically upper side from the pressure sensitive surface 32a.

Meanwhile, in the state of use shown in FIG. 8, of the plural second holes 512, at least the second hole 512 situated on the lower side in FIG. 8 is situated on the vertically lower side from the pressure sensitive surface 32a, and the second hole 512 situated on the upper side in FIG. 8 is situated on the vertically upper side from the pressure sensitive surface 32a. In this way, in the liquid level meter 1, even in the laterally laid state, at least one hole 51 is situated on each of the vertically lower side and the vertically upper side from the pressure sensitive surface 32a.

The material to form the cap 5 is not particularly limited and may include, for example, various resin materials such as polyethylene, polypropylene, polyvinyl chloride, polyamide, polyimide, acrylonitrile butadiene styrene copolymer (ABS resin), acrylonitrile styrene copolymer (AS resin), polyether ether ketone (PEEK), polyetherimide, and polyacetal (POM) like polyoxymethylene, various metal materials such as iron, nickel, cobalt, copper, aluminum, magnesium, and zinc (including various alloys such as stainless steel, inconel, and duralumin), and various ceramics such as alumina, titania, silicon nitride, aluminum nitride, and titanium nitride. Of these materials, a resin material is preferable as the material to form the cap 5, and polyacetal (POM) such as polyoxymethylene is more preferable. Using such a resin, the strength of the cap 5 can be maintained sufficiently and each hole 51 can be easily formed by drilling or the like.

Up to this point, the liquid level meter 1 of this embodiment is described. Also, a temperature sensor that detects the temperature of the liquid L in the internal space S2 may be added to the liquid level meter 1. If such a temperature sensor is provided, temperature correction can be made to a signal (resonance frequency) from the piezoelectric oscillation element 34. Therefore, the liquid level can be detected more accurately.

Second Embodiment

Next, a second embodiment of a liquid level meter according to the invention will be described.

Figure 9:
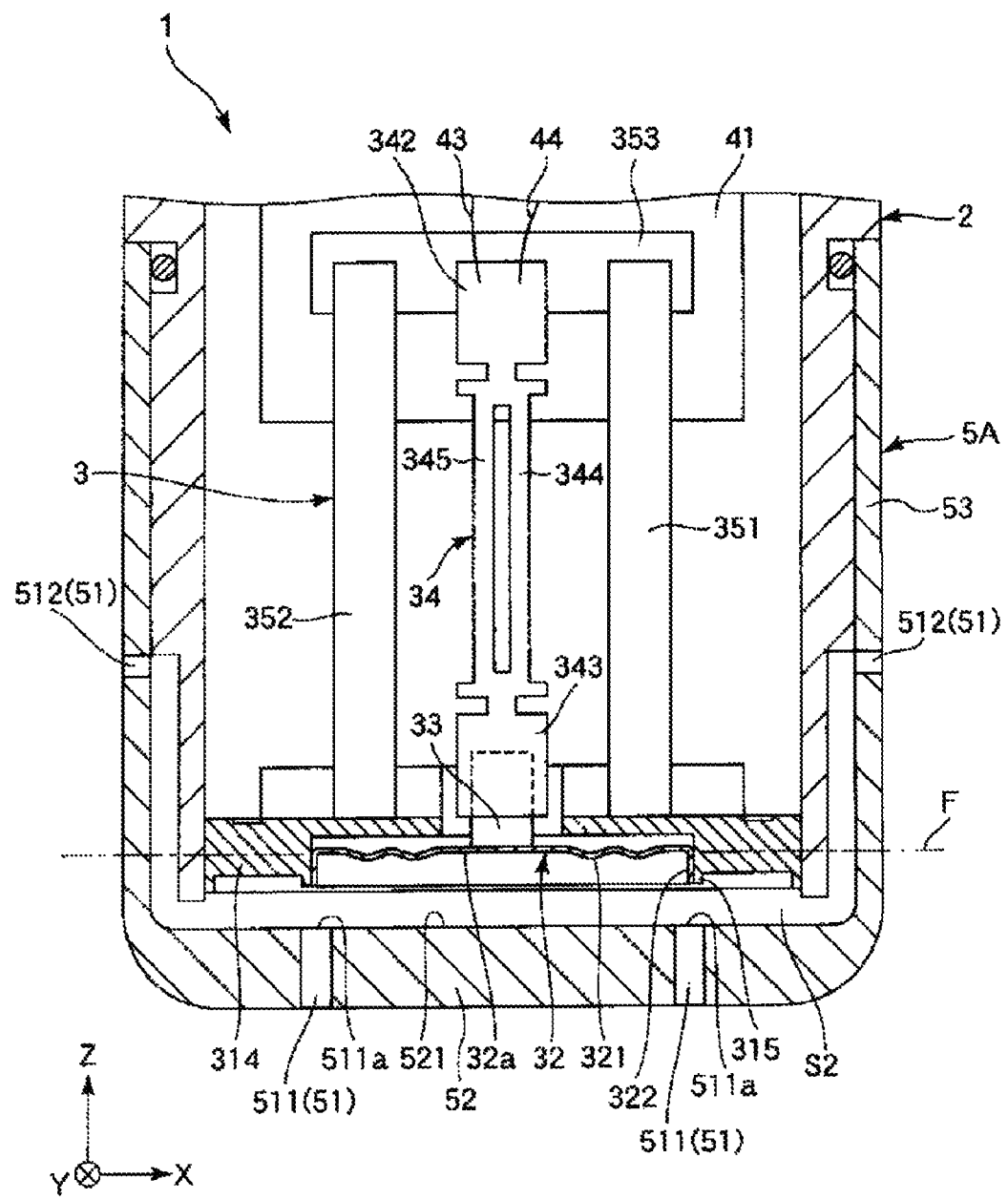
FIG. 9 is a sectional view of a liquid level meter according to a second embodiment of the invention.
Figure 10:
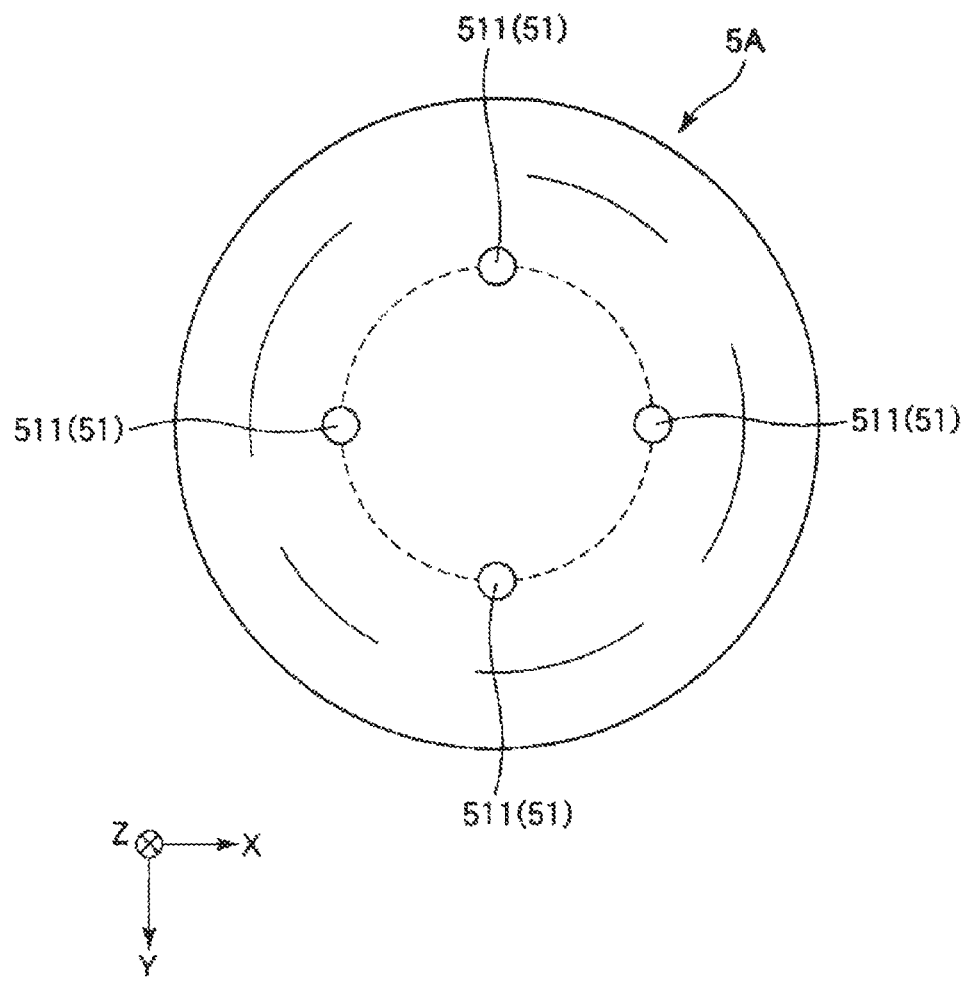
FIG. 10 is a plan view of a cap shown in FIG. 9.

FIG. 9 is a sectional view of a liquid level meter according to the second embodiment of the invention. FIG. 10 is a plan view of a cap shown in FIG. 9.

Hereinafter, the liquid level meter of the second embodiment will be described mainly in terms of its differences from the first embodiment. Similar parts will not be described further in detail.

The liquid level meter according to the second embodiment of the invention is similar to the first embodiment except that the configuration of the cap is different. Similar configurations to the first embodiment are denoted by the same reference numerals.

In a cap 5A shown in FIGS. 9 and 10, four first holes 511 are formed away from each other with an equal spacing along the circumferential direction of the cap 5A. The number of first holes 511 is not limited to four and may be three or fewer, or five or more.

An opening 511a on the side of the internal space S2, of each first hole 511, is provided avoiding the central part of the pressure sensitive surface 32a of the diaphragm 32 (the portion of the displacement portion 321 joined to the fixing member 33), as viewed in a plan view of the pressure sensitive surface 32a. In this embodiment, each opening 511a is provided facing the welded portion between the outer peripheral portion 322 and the projection 315. As each opening 511a is arranged in this way, each opening 511a and the central part of the pressure sensitive surface 32a can be as separated away from each other as possible. Therefore, the liquid L introduced into the internal space S2 via the first holes 511 can be prevented from striking the central part of the pressure sensitive surface 32a with the same force as in the introduction. Thus, application of other external forces (dynamic pressures) than the liquid pressure (pressure applied according to the liquid level) to the central part of the pressure sensitive surface 32a can be restrained. Therefore, the liquid level meter 1 can obtain a stable and accurate output from the piezoelectric oscillation element 34 and can detect the liquid level more accurately.

Each opening 511a is not limited to this example. For example, each opening 511a may be provided facing the outer peripheral portion of the pressure sensitive surface 32a or may be provided facing the sidewall portion 314.

According to the second embodiment, similar effects to the first embodiment can be achieved.

Third Embodiment

Next, a third embodiment of a liquid level meter according to the invention will be described.

Figure 11:
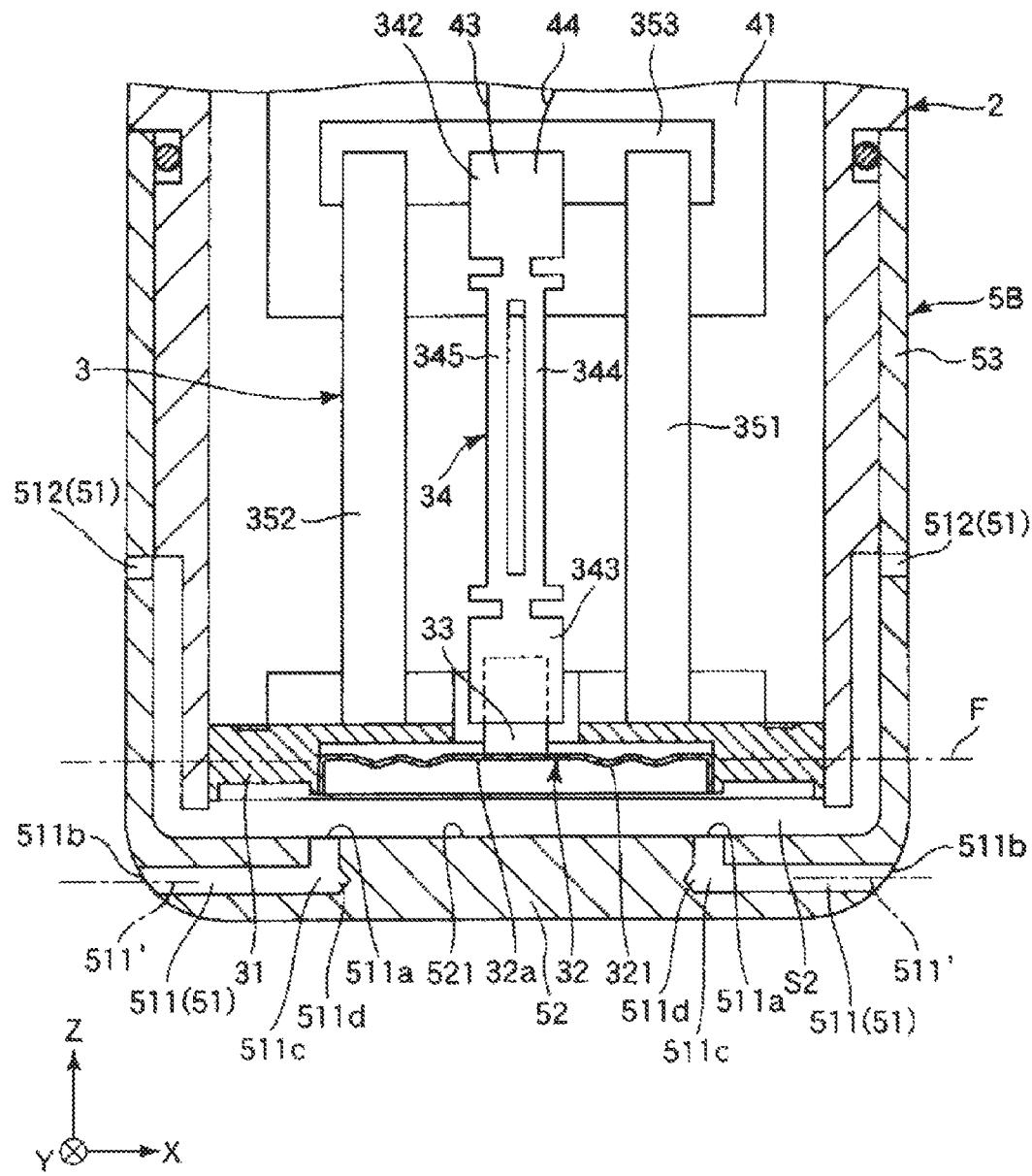
FIG. 11 is a sectional view of a liquid level meter according to a third embodiment of the invention.
Figure 12:
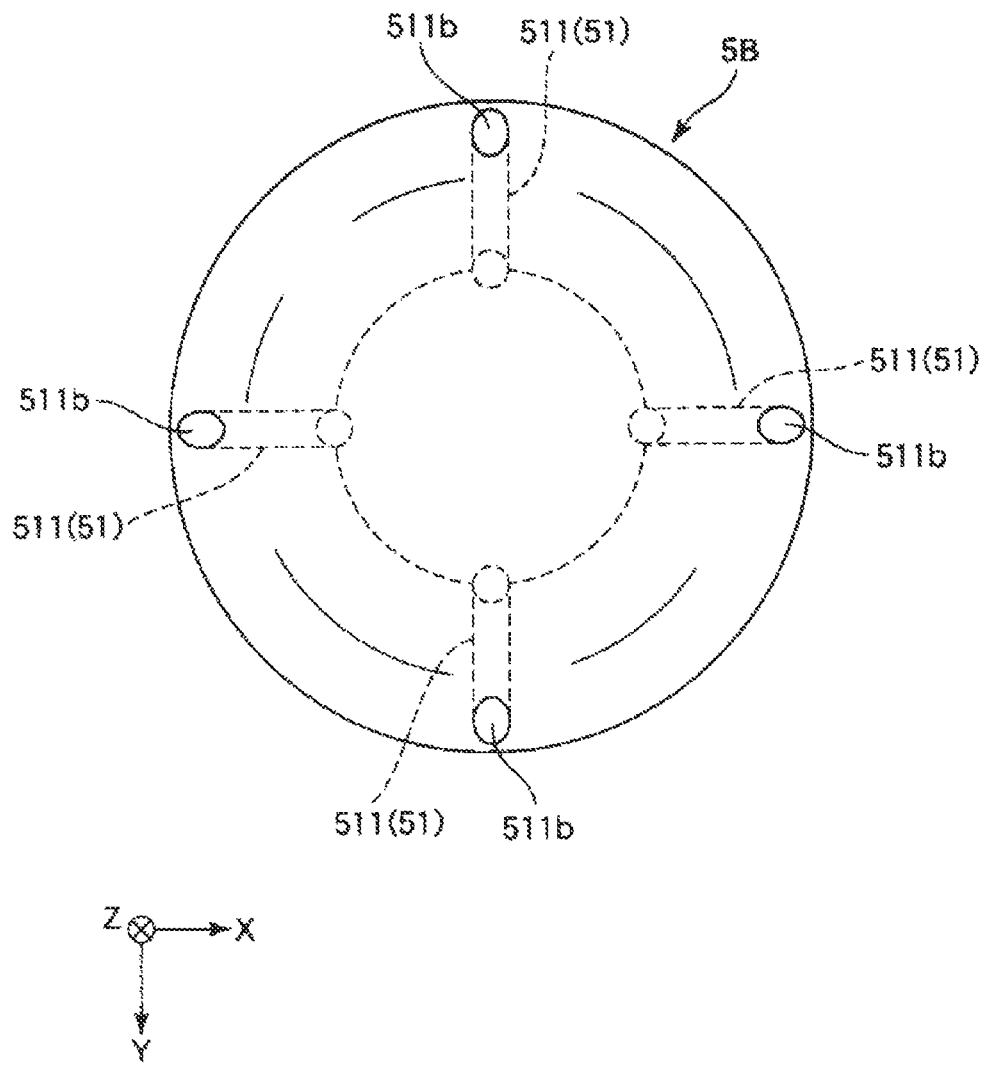
FIG. 12 is a plan view of a cap shown in FIG. 11.

FIG. 11 is a sectional view of a liquid level meter according to the third embodiment of the invention. FIG. 12 is a plan view of a cap shown in FIG. 11.

Hereinafter, the liquid level meter of the third embodiment will be described mainly in terms of its differences from the first embodiment. Similar parts will not be described further in detail.

The liquid level meter according to the third embodiment of the invention is similar to the first embodiment except that the configuration of the cap is different. Similar configurations to the first embodiment are denoted by the same reference numerals.

In a cap 5B shown in FIGS. 11 and 12, four first holes 511 are formed away from each other with an equal spacing along the circumferential direction of the cap 5B. The number of first holes 511 is not limited to four and may be three or fewer, or five or more.

The opening 511a on the side of the internal space S2, of each first hole 511, is provided avoiding the central part of the pressure sensitive surface 32a of the diaphragm 32 (the portion of the displacement portion 321 joined to the fixing member 33), as viewed in a plan view of the pressure sensitive surface 32a. In this embodiment, each opening 511a is provided facing the welded part between the outer peripheral portion 322 and the projection 315. With such an arrangement, similar effects to the second embodiment can be achieved. Each opening 511a is not limited to this example. For example, each opening 511a may be provided facing the outer peripheral part of the pressure sensitive surface 32a or may be provided facing the sidewall portion 314.

Each first hole 511 has, in the middle thereof, a flexure portion (bending portion) 511c flexing substantially at right angles. By thus flexing the first holes 511 in the middle, the flow speed of the liquid L introduced into the internal space S2 via the first holes 511 can be restrained. Therefore, application of other external forces than the liquid pressure to the pressure sensitive surface 32a can be restrained. Also, a foreign matter such as sand is less likely to enter the internal space S2 via the first holes 511. Therefore, a stable output can be obtained from the piezoelectric oscillation element 34 and the liquid level can be detected more accurately. Also, the first holes 511 may have, in the middle thereof, for example, an S-shaped curved portion instead of (or in addition to) the flexure portion 511c. In the case where the curved portion is provided, similar effects to this embodiment can be achieved.

At a position that is in the flexure portion 511c of each first hole 511 and that is struck by the liquid L entering from an opening 511b, a depressed portion 511d depressed from the inner peripheral surface is formed. This depressed portion 511d has the function of capturing a foreign matter such as sand entering into the first holes 511. Thus, entry of the foreign matter into the internal space S2 can be restrained effectively.

The opening 511b on the outer side of the cap 5, of each first hole 511, is arranged at a position avoiding an area that overlaps the pressure sensitive surface 32a in the direction of a normal line thereto. In other words, each opening 511b is situated outside the pressure sensitive surface 32a, as viewed in a plan view of the pressure sensitive surface 32a. Also, each opening 511b is situated in a rounded part that is a boundary part between the bottom portion and the sidewall portion of the cap 5B. An end on the side of the opening 511b, of each first hole 511, has an axis 511' (extends) in a direction substantially orthogonal to the center axis (Z-axis) of the liquid level meter 1. As each first hole 511 is configured in this way, for example, in the case of the state of use shown in FIG. 5, gases (air and other gases) and hot water emitted from the ground such as seafloor or riverbed are less likely to be introduced into the internal space S2 via the first holes 511. Therefore, generation of residual air due to entry of external gases, and sudden temperature change in the liquid L in the internal space S2 due to entry of hot water can be prevented effectively. As a result, the liquid level meter 1 can obtain a stable and accurate output from the piezoelectric oscillation element 34 and can detect the liquid level more accurately.

According to the third embodiment, similar effects to the first embodiment can be achieved.

Fourth Embodiment

Figure 13:
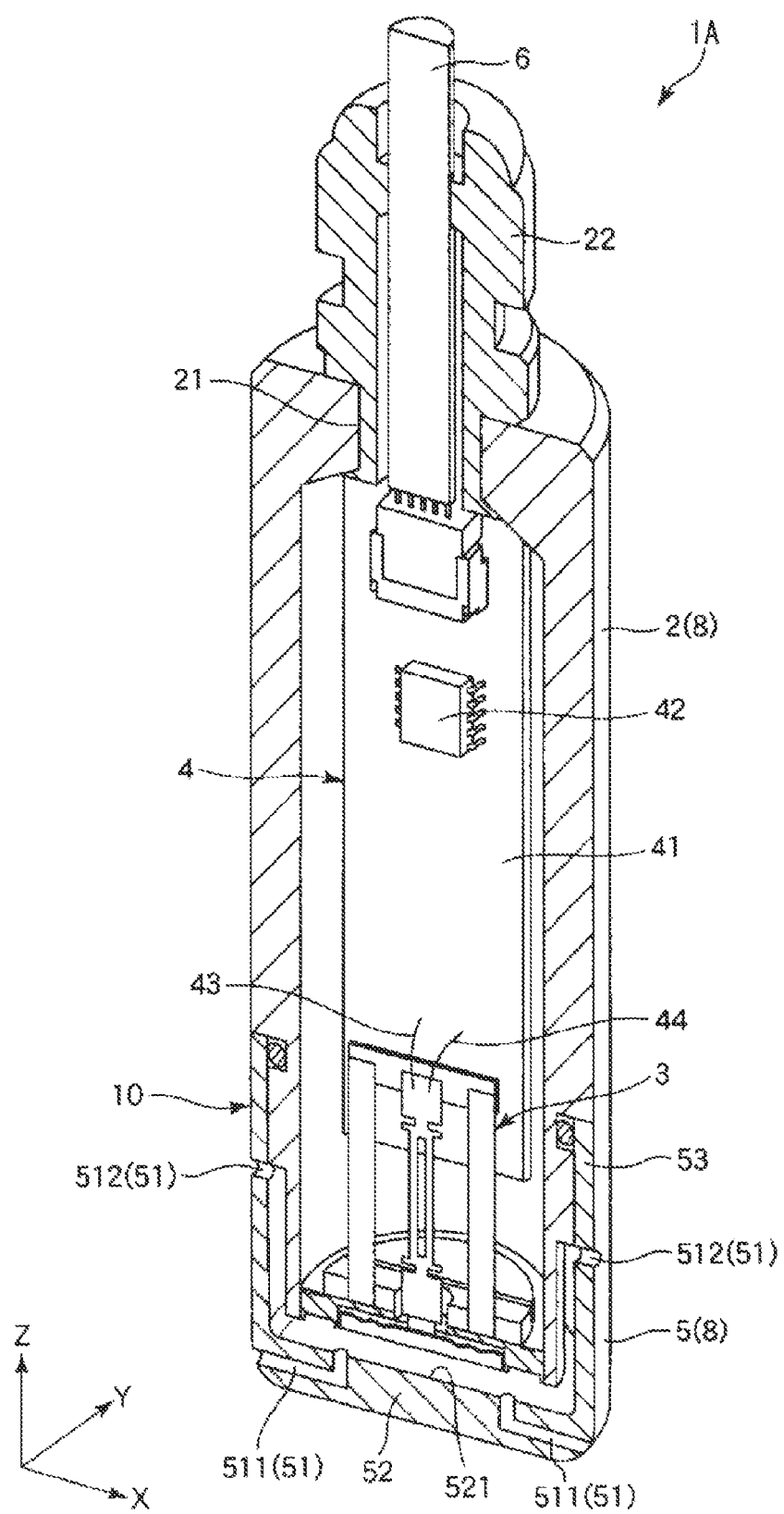
FIG. 13 is a perspective view of a liquid level meter according to a fourth embodiment of the invention.
Figure 14:
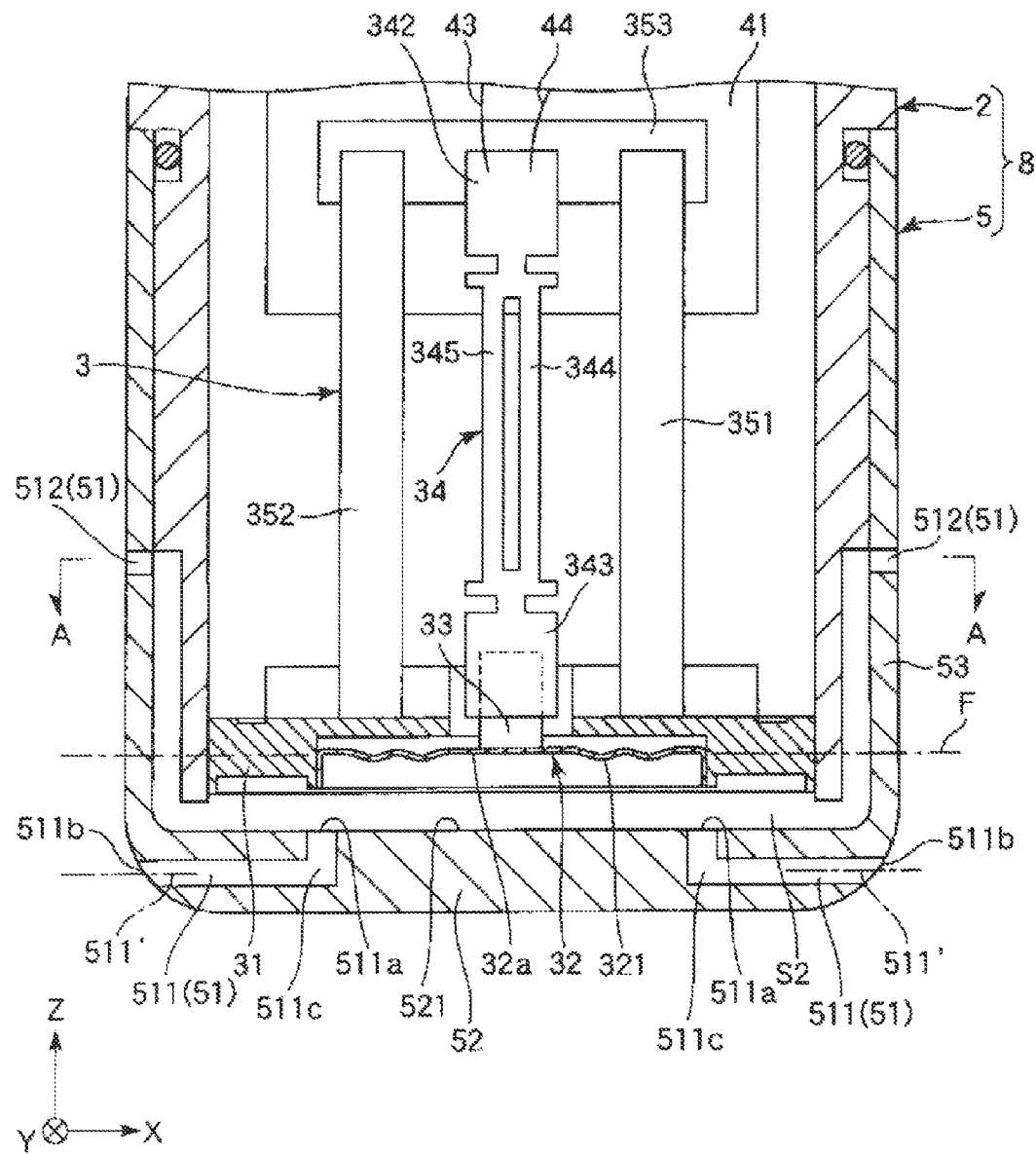
FIG. 14 is a longitudinal sectional view of a cap provided in the liquid level meter shown in FIG. 13.
Figure 15:
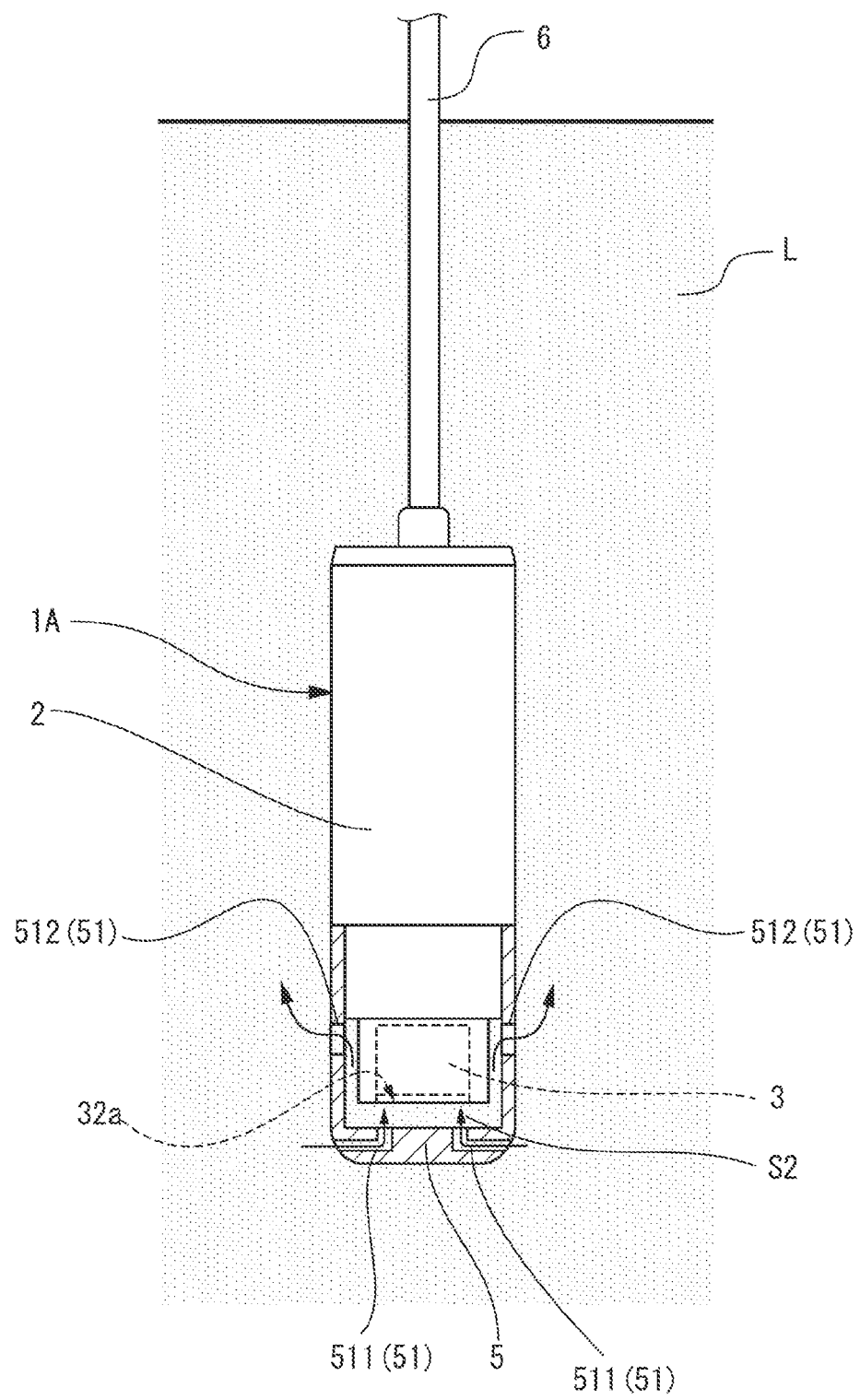
FIG. 15 shows a state of use of the liquid level meter shown in FIG. 13.
Figure 16:
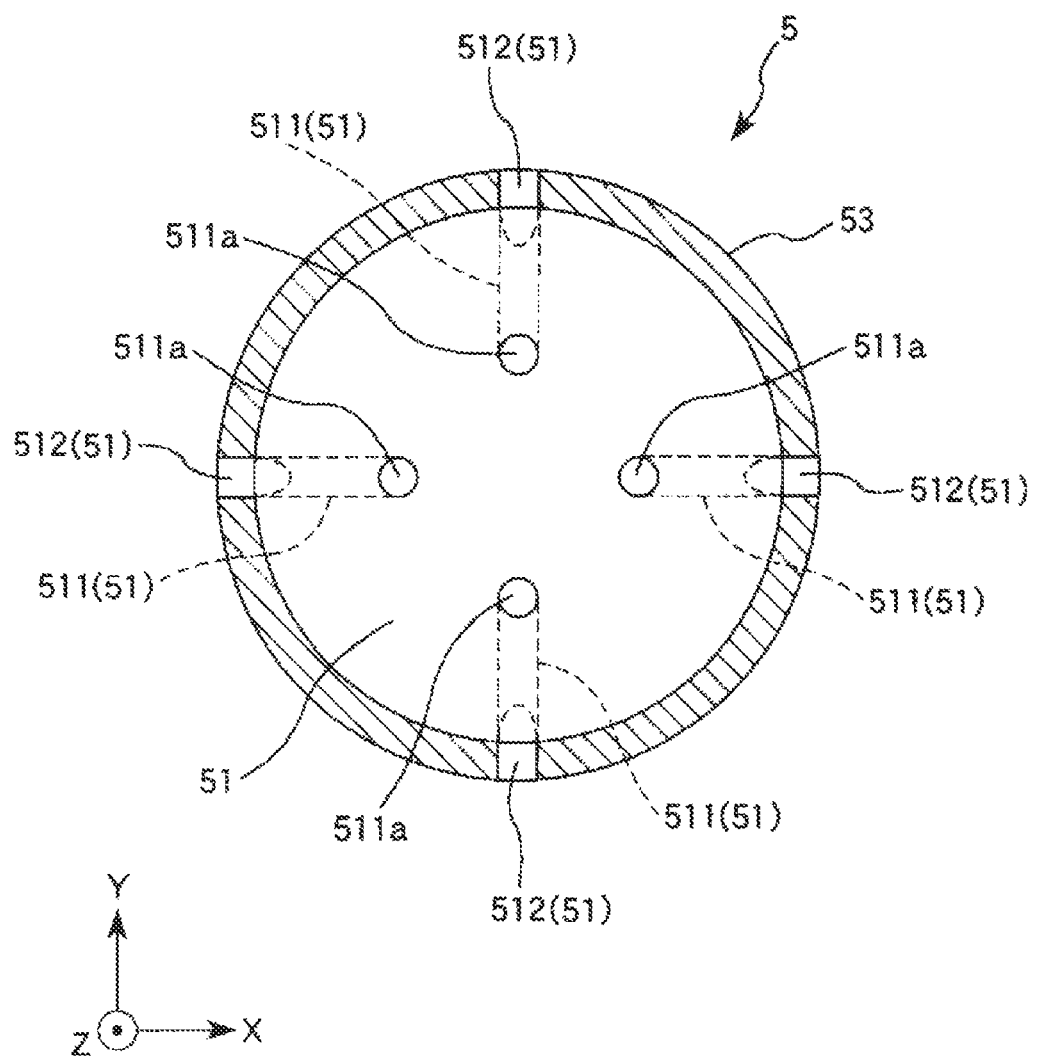
FIG. 16 is a lateral sectional view of the cap provided in the liquid level meter shown in FIG. 13 (section taken along line A-A in FIG. 14).
Figure 17:
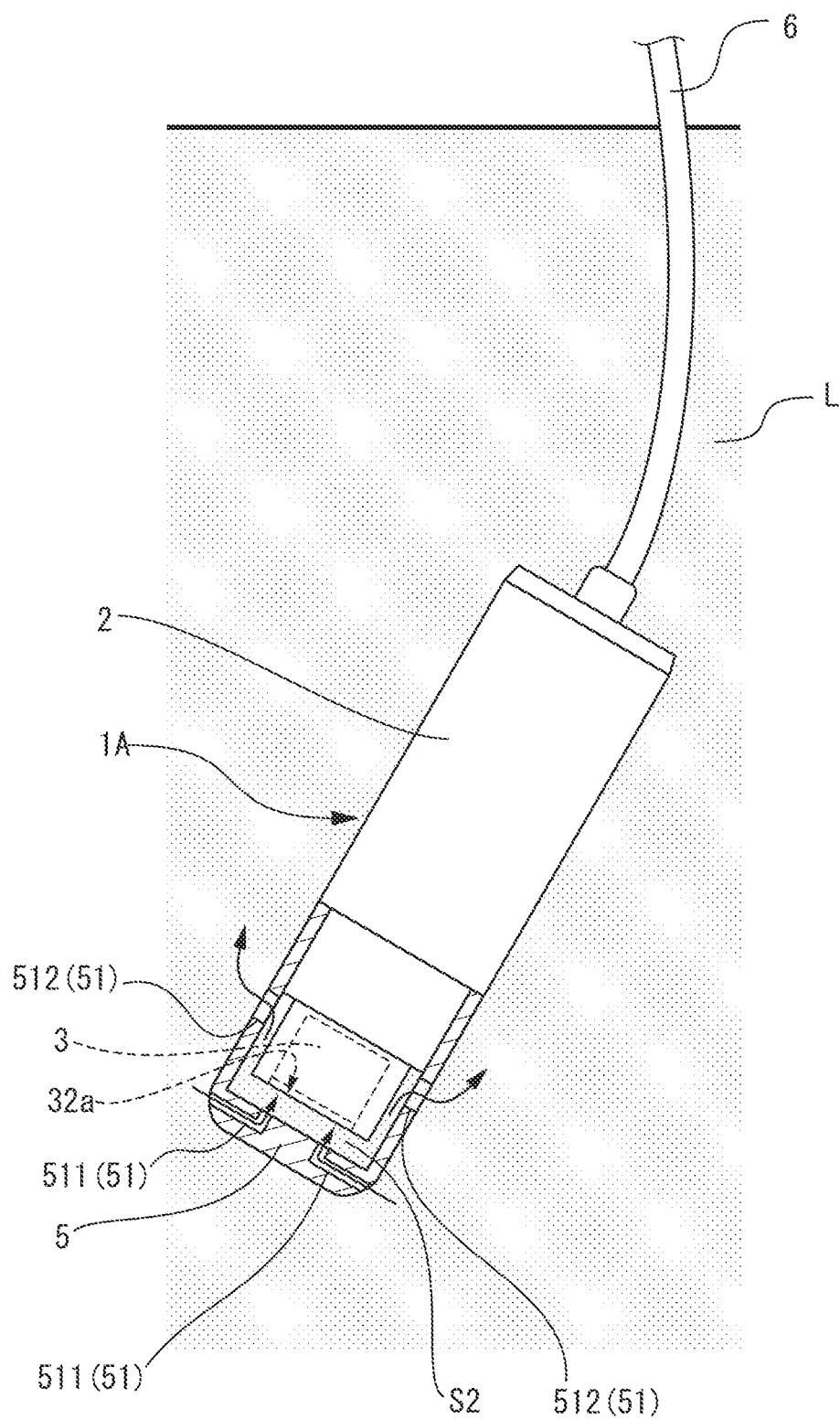
FIG. 17 shows another state of use of the liquid level meter shown in FIG. 13.
Figure 18:
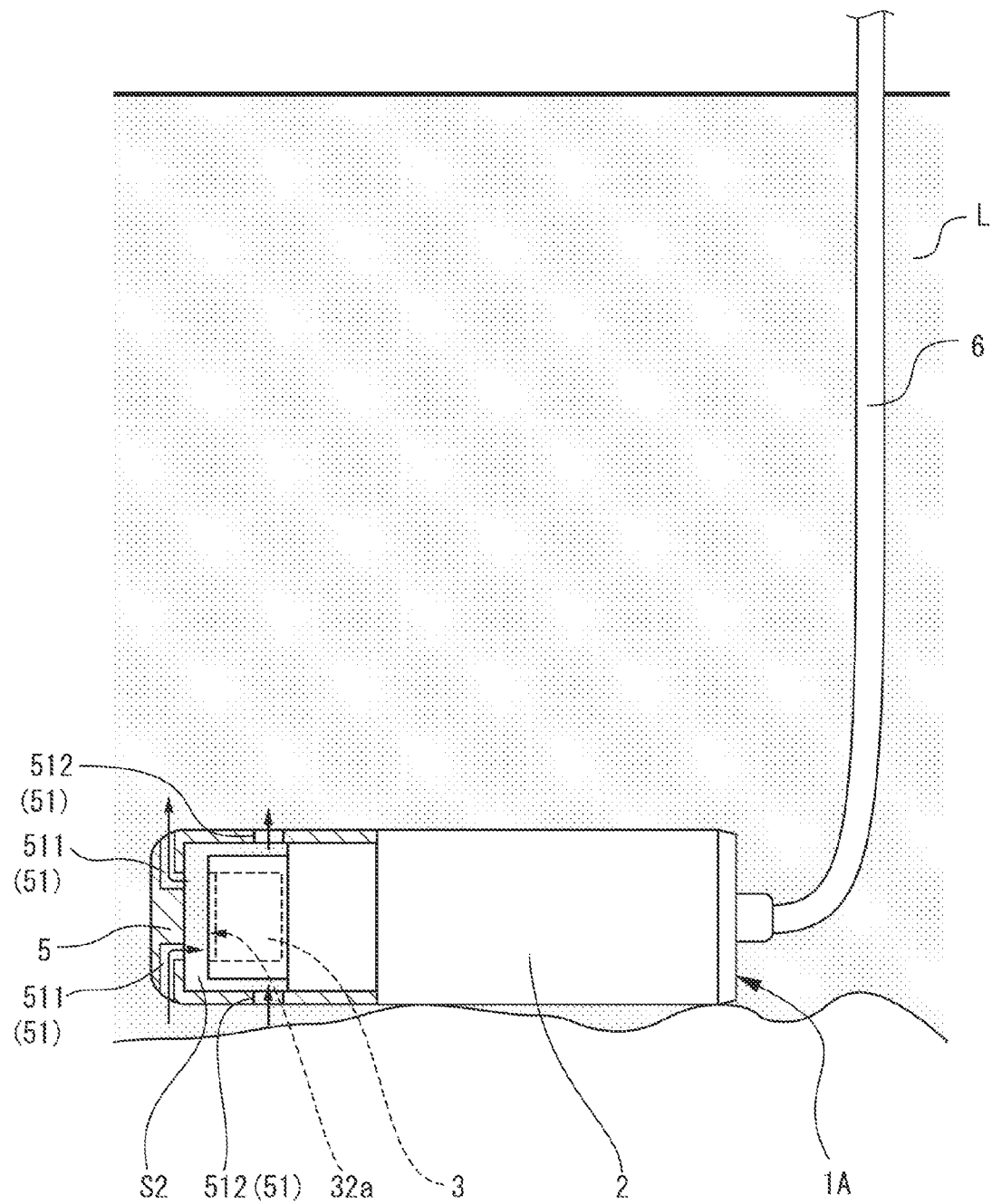
FIG. 18 shows another state of use of the liquid level meter shown in FIG. 13.

FIG. 13 is a perspective view of a liquid level meter according to a fourth embodiment of the invention. FIG. 14 is a longitudinal sectional view of a cap provided in the liquid level meter shown in FIG. 13. FIG. 15 shows a state of use of the liquid level meter shown in FIG. 13. FIG. 16 is a lateral sectional view of the cap provided in the liquid level meter shown in FIG. 13 (section taken along line A-A in FIG. 14). FIGS. 17 and 18 show other states of use of the liquid level meter shown in FIG. 13. Hereinafter, for convenience of explanation, three axes orthogonal to each other are referred to as an X axis, Y axis, and Z axis, as shown in FIG. 13. Also, directions parallel to the X axis, Y axis, and Z axis are referred to as an X-axis direction, Y-axis direction, and Z-axis direction, respectively. In FIGS. 15, 17 and 18, the lower side of the sheet is regarded as a vertically lower side, whereas the upper side of the sheet is regarded as a vertically upper side.

A liquid level meter 1A shown in FIG. 13 has a housing 2, a pressure sensitive portion 3 and a circuit unit 4 arranged in the housing 2, a cap 5 mounted on the housing 2, and a cable 6 connected to the circuit unit 4 and extending from the housing 2. Of these parts, the housing 2 and the cap 5 form an exterior potion 8 of the liquid level meter 1A. This exterior portion 8 and the pressure sensitive portion 3 form a liquid pressure meter (liquid pressure meter according to the invention) 10.

The liquid level meter 1A is arranged for use in a liquid (liquid to be measured) L, for example, an ocean, river, lake, dam (dam lake), reservoir, agricultural water, industrial water or the like, and detects the liquid level based on the liquid pressure applied on the pressure sensitive portion 3. The liquid level meter 1A can also be used as a liquid level detection unit in a broad range of other fields. For example, if the liquid level meter 1A is arranged in a tank of a tanker, the liquid level meter 1A can detect the liquid level of ballast water. Also, the liquid L in which the liquid level meter 1A can be used is not particularly limited. For example, various waters such as seawater and fresh water, and various chemicals such as formaldehyde solution (formalin) and sodium solution can be applied. The viscosity of the liquid L is not particularly limited, either.

Hereinafter, each part constituting the liquid level meter 1A will be described in order.

Housing

As shown in FIG. 13, the housing 2 is in the shape of a cylinder with a closed bottom and has a housing space S1 therein for housing and arranging the pressure sensitive portion 3 and the circuit unit 4. This housing 2 has the same configuration as in the first embodiment (see FIG. 2) and therefore will not be described further in detail.

As in the first embodiment, the length and diameter of the housing 2 are not particularly limited. Depending on the size or the like of the pressure sensitive portion 3, for example, a length of approximately 5 cm or longer and 10 cm or shorter may be preferable, and a diameter of approximately 2 cm or greater and 5 cm or smaller may be preferable. By employing these ranges of sizes, the liquid level meter 1A can be reduced in size. Also, for example, a very convenient liquid level meter 1A that can be inserted in a narrow tube can be realized.

Pressure Sensitive Portion

The pressure sensitive portion 3 has a holding member 31, a diaphragm (pressure receiving portion) 32, a fixing member 33, a piezoelectric oscillation member (pressure sensitive element) 34, and a supporting member 35. Since the pressure sensitive portion 3 uses the diaphragm 32 and the piezoelectric oscillation element 34, the pressure sensitive portion 3 has a simple configuration and can achieve excellent detection accuracy.

The holding member 31, the diaphragm (pressure receiving portion) 32, the fixing member 33, the piezoelectric oscillation element (pressure sensitive element) 34 and the supporting member 35 of the pressure sensitive portion 3 have the same configurations as in the first embodiment (see FIG. 2) and therefore will not be described further in detail.

Circuit Board

As shown in FIG. 13, the circuit unit 4 has a circuit board 41, and an IC chip 42 arranged on the circuit board 41. The circuit board 41 is fixed to an inner peripheral surface of the housing 2 with an adhesive or the like, not shown. The circuit board 41 has the same configuration as in the first embodiment (see FIG. 2) and therefore will not be described further in detail.

Cable

The cable 6 is drawn from the inside to the outside of the housing 2 via the through-hole 21. One end of such a cable 6 (an end situated on the inner side of the housing 2) is electrically connected to the circuit unit 4. At the other end of the cable 6, for example, a connector is provided, though not shown. If this connector is connected to an external device (for example, a computer), not shown, the result of detection by the liquid level meter 1A can be acquired at the external device.

Cap

As shown in FIG. 14, the cap 5 is mounted on the housing 2 in such a way as to cover the diaphragm 32 exposed from the housing 2. The cap 5 is in the shape of a cylinder with a closed bottom, and has a bottom portion 52 and a frame-like (annular) sidewall portion 53 erected from an edge of the bottom portion 52. Such a cap 5 may be removably mounted, for example, by a method such as screwing or fitting, or may be mounted in an unremovable manner by a method such as pressing-in or fixing.

In the state where the cap 5 is mounted on the housing 2, an internal space S2 in which the liquid L enters is formed between the inner surface of the cap 5 and the diaphragm 32 and between the inner surface of the cap 5 and a lower-end lateral surface of the housing. In other words, the exterior portion 8 has the internal space S2 in which the liquid L enters. The diaphragm 32 is provided in such a way as to be exposed to (face) this internal space S2.

Also, plural holes 51 connecting the inside and outside of the internal space S2 (the internal space S2 and the outside of the exterior portion 8) are formed in the cap 5. These plural holes 51 include at least one introduction hole for introducing the liquid L into the internal space S2 and at least one discharge hole for discharging air and the liquid L from the internal space S2.

The plural holes 51 include plural first holes 511 situated below (on one side from) the plane F including the pressure sensitive surface (the surface of the displacement portion 321 contacting the liquid L) 32a of the diaphragm 32, and plural second holes 512 situated above (on the other side from) the plane F. In other words, in the cap 5, at least one hole 51 is formed on each of the two sides from the plane F, as viewed in a plan view seen from a direction (for example, the Y-axis direction as shown in FIG. 14) orthogonal to the Z axis (the direction of thickness of the diaphragm 32). Here, the plane F refers to an XY plane intersecting with the upper end of the pressure sensitive surface 32a (a surface parallel to the diaphragm 32). The position of each hole 51 is determined, using the lower end of the opening on the side of the internal space S2 (a portion situated on the lowest side in FIG. 14) as a reference.

In this way, as at least one hole 51 is situated on each of the two sides from the plane F, the air in the internal space S2, particularly, the air around the pressure sensitive surface 32a, can be discharged effectively. Therefore, the liquid pressure can be detected accurately. This effect will be described specifically below.

FIG. 15 shows an example of the state of use of the liquid level meter 1A. In FIG. 15, the lower side of the sheet is the vertically lower side, and the upper side of the sheet is the vertically upper side. In this way, the liquid level meter 1A is arranged for use in the liquid L, with the cap 5 facing the vertically lower side. In this state, of the plural holes 51, the plural first holes 511 situated on the vertically lower side from the plane F function as introduction holes to introduce the liquid L into the internal space S2, and the plural second holes 512 situated on the vertically upper side from the plane F function as discharge holes to discharge the air from the internal space S2. That is, when the liquid level meter 1A is placed in the liquid L, the liquid L is introduced into the internal space S2 from the first holes 511, and the air is discharged from the plural second holes 512. As a result, the internal space S2 is substantially filled with the liquid L. By detecting the resonance frequency of the piezoelectric oscillation element 34 in this state, the liquid level of the liquid L can be detected accurately.

As shown in FIG. 16, four second holes 512 are formed in the sidewall portion 53 of the cap. The four second holes 512 are formed away from each other with an equal spacing along the circumferential direction of the sidewall portion 53. Therefore, it can be said that, in the cap 5, at least one hole 51 is formed on each of the two sides of the pressure sensitive surface 32a in a direction parallel to the plane F (in the in-plane direction of the XY plane). By thus forming plural second holes 512 along the circumferential direction of the cap 5, the air inside the internal space S2 can be discharged efficiently. Also, as described later, an excellent detection characteristic can be achieved in any attitude, without being affected by the attitude of the liquid level meter 1A. The number of second holes 512 is not limited to four and may be three or less, or five or more.

The diameter (maximum width) of each second hole 512 is not particularly limited. However, approximately 3 mm or greater and 5 mm or smaller is preferable, and approximately 4 mm is more preferable. Using such a size, the air can be smoothly discharged from the internal space S2 via the second holes 512. Though the diameter of each second hole 512 depends on the number of second holes 512, for example, if the number of second holes 512 is the same or approximately the same (for example, approximately ±2) as the number of first holes 511, it is preferable that the diameter of each second hole 512 is greater than the diameter of the first hole 511. Thus, the capability to discharge the air from the internal space S2 (the maximum amount of discharge per unit time) can be made greater than the capability to introduce the liquid L into the internal space S2 (the maximum amount of introduction per unit time). Therefore, the liquid L can be introduced into the internal space S2 more smoothly.

Four first holes 511 are formed in the bottom portion 52 of the cap 5. The four first holes 511 are formed away from each other with an equal spacing along the circumferential direction of the bottom portion 52. Thus, the liquid L can be smoothly introduced into the internal space S2 via the first holes 511. Also, since the diameter of each first hole 511 can be reduced while securing smooth introduction of the liquid L into the internal space S2, entry of a foreign matter such as gravel into the internal space S2 can be prevented or restrained effectively. The number of first holes 511 is not limited to four and may be three or fewer, or five or more.

The diameter (maximum width) of each first hole 511 is not particularly limited. However, approximately 1 mm or greater and 3 mm or smaller is preferable, and approximately 2 mm is more preferable. Using such a size, the liquid L can be introduced smoothly into the internal space S2 while entry of a foreign matter into the internal space S2 can be restrained.

An opening 511a on the side of the internal space S2, of each first hole 511, is provided avoiding the central part of the pressure sensitive surface 32a of the diaphragm 32 (the portion of the displacement portion 321 joined to the fixing member 33), as viewed in a plan view of the pressure sensitive surface 32a. Each opening 511a in this embodiment is provided facing the welded portion between the outer peripheral portion 322 and the projection 315. As each opening 511a is arranged in this way, each opening 511a and the central part of the pressure sensitive surface 32a can be as separated away from each other as possible. Therefore, the liquid L introduced into the internal space S2 via the first holes 511 can be prevented from striking the central part of the pressure sensitive surface 32a with the same force as in the introduction. Thus, application of other external forces (dynamic pressures) than the liquid pressure (liquid pressure based on the liquid level) to the central part of the pressure sensitive surface 32a can be restrained. Therefore, the liquid level meter 1A can obtain a stable and accurate output from the piezoelectric oscillation element 34 and can detect the liquid level more accurately.

Each first hole 511 has, in the middle thereof (between the opening 511a and an opening 511b), a flexure portion (bending portion) 511c. By thus flexing the first holes 511 in the middle, the flow speed of the liquid L introduced into the internal space S2 via the first holes 511 can be restrained. Therefore, application of dynamic pressures to the pressure sensitive surface 32a can be restrained. Thus, the liquid level meter 1A can obtain a stable and accurate output from the piezoelectric oscillation element 34 and can detect the liquid level more accurately.

The flexure angle of the flexure portion 511c, that is, the angle formed by the axes on one side and the other side of the flexure portion 511c, is not particularly limited. However, approximately 80 degrees or greater and 100 degrees or smaller is preferable, and approximately 90 degrees is more preferable. By using such an angle, the above effects can be achieved more effectively. If the angle is smaller than the above lower limit, there is a risk of failing to sufficiently lower the flow speed of the liquid L in the case where the first holes 511 have a large diameter or the like. On the other hand, if the angle exceeds the above upper limit, there is a risk of failing to smoothly introduce the liquid L into the internal space S2 as the passage of the liquid L through the flexure portion 511c is obstructed excessively in the case where the first holes 511 have a small diameter or the like.

The opening 511b on the outer side of the cap 5, of each first hole 511, is arranged at a position avoiding an area that overlaps the pressure sensitive surface 32a in the direction of a normal line thereto. In other words, each opening 511b is situated outside the pressure sensitive surface 32a, as viewed in a plan view of the pressure sensitive surface 32a. Also, each opening 511b is situated in a rounded part that is a boundary part between the bottom portion 52 and the sidewall portion 53 of the cap 5. An end on the side of the opening 511b, of each first hole 511, has an axis 511' in a direction substantially orthogonal to the center axis (Z-axis) of the liquid level meter 1A. As each first hole 511 is configured in this way, for example, in the case of the state of use shown in FIG. 15, gases (air and other gases) and hot water emitted from the ground such as seafloor or riverbed are less likely to be introduced into the internal space S2 via the first holes 511. Therefore, entry of gases into the internal space from outside, and sudden temperature change in the liquid L in the internal space S2 due to entry of hot water can be prevented effectively. Also, entry of a foreign matter such as gravel into the internal space S2 can be prevented or restrained effectively. As a result, the liquid level meter 1A can obtain a stable and accurate output from the piezoelectric oscillation element 34 and can detect the liquid level more accurately.

As described above, in this embodiment, the angle formed by the axis 511' and the Z axis is approximately 90 degrees. However, as long as this angle is approximately 80 degrees or greater and 100 degrees or smaller, similar effects to this embodiment can be achieved. Also, each opening 511b may be situated in the sidewall portion 53, instead of being situated on the boundary between the bottom portion 52 and the sidewall portion 53. Moreover, in the case where the bottom portion 52 is dome-shaped, for example, hemispheric, conical, truncated-conical or the like, each opening 511b may be situated in the bottom portion 52.

In the cap 5, an inner surface 521 of the bottom portion 52 faces the diaphragm 32 and is substantially parallel to the diaphragm 32. The separation length between the inner surface 521 and the diaphragm 32 (plane F) is not particularly limited. However, for example, approximately 0.5 mm or longer and 5.0 mm or shorter is preferable, and approximately 0.5 mm or longer and 3.0 mm or shorter is more preferable. Using such a separation length, the air present between the inner surface 521 and the diaphragm 32 can be securely discharged from the internal space S2 on introducing the liquid L into the internal space S2, and the volume of the liquid L filling the space between the diaphragm 32 and the inner surface 521 can be restrained. Therefore, for example, generation of convection of the liquid L in the internal space S2 can be restrained effectively. Thus, the liquid level meter 1A can obtain a stable and accurate output from the piezoelectric oscillation element 34 and can detect the liquid level more accurately.

Up to this point, the liquid level meter 1A is described. As described above, the liquid level meter 1A is configured in such a way that, in the state of use shown in FIG. 15, at least one hole 51 is situated on each of the vertically lower side and the vertically upper side from the pressure sensitive surface 32a. Here, the inventors recommend the state of use shown in FIG. 15, as a state of use of the liquid level meter 1A. However, there is a risk that the liquid level meter 1A may be used in different states, depending on the environment where the liquid level meter 1A is used, and the user's misrecognition or the like. Therefore, the liquid level meter 1A is configured to meet the above conditions even in other states than the state of use shown in FIG. 15. Thus, in the liquid level meter 1A, generation of residual air A can be restrained and an excellent detection characteristic can be achieved, irrespective of the attitude of the liquid level meter 1A.

Specifically, for example, in the case where a flow of the liquid L is generated, as in a river or ocean, the liquid level meter 1A may follow the flow of the liquid L and become inclined, as shown in FIG. 17. Also, if the user does not correctly understand the method of use, the case where the liquid level meter 1A is used as it is laid down on the seafloor, as shown in FIG. 18, can be considered. In the liquid level meter 1A of this embodiment, plural first and second holes 511, 512 are formed along the circumferential direction of the cap 5 so that at least one hole 51 is situated on each of the vertically lower side and the vertically upper side from the pressure sensitive surface 32a even in such states of use.

In the state of use shown in FIG. 17, of the plural second holes 512, the second hole 512 situated on the left-hand side in FIG. 17 is situated on the vertically upper side from the pressure sensitive surface 32a, and each first hole 511 is situated on the vertically lower side from the pressure sensitive surface 32a. In this way, in the liquid level meter 1A, even in the inclined state, at least one hole 51 is situated on each of the vertically lower side and the vertically upper side from the pressure sensitive surface 32a.

Meanwhile, in the state of use shown in FIG. 18, of the plural second holes 512, at least the second hole 512 situated on the lower side in FIG. 18 is situated on the vertically lower side from the pressure sensitive surface 32a, and the second hole 512 situated on the upper side in FIG. 18 is situated on the vertically upper side from the pressure sensitive surface 32a. Also, of the plural first holes 511, at least the first hole 511 situated on the lower side in FIG. 18 is situated on the vertically lower side from the pressure sensitive surface 32a, and the first hole 511 situated on the upper side in FIG. 18 is situated on the vertically upper side from the pressure sensitive surface 32a. In this way, in the liquid level meter 1A, even in the laterally laid state, at least one hole 51 is situated on each of the vertically lower side and the vertically upper side from the pressure sensitive surface 32a.

The material to form the cap 5 is not particularly limited and may include, for example, various resin materials such as polyethylene, polypropylene, polyvinyl chloride, polyamide, polyimide, acrylonitrile butadiene styrene copolymer (ABS resin), acrylonitrile styrene copolymer (AS resin), polyether ether ketone (PEEK), polyetherimide, and polyacetal (POM) like polyoxymethylene, various metal materials such as iron, nickel, cobalt, copper, aluminum, magnesium, and zinc (including various alloys such as stainless steel, inconel, and duralumin), and various ceramics such as alumina, titania, silicon nitride, aluminum nitride, and titanium nitride. Of these materials, a resin material is preferable as the material to form the cap 5, and polyacetal (POM) such as polyoxymethylene is more preferable. Using such a resin, the strength of the cap 5 can be maintained sufficiently and each hole 51 can be easily formed by drilling or the like.

Up to this point, the liquid level meter 1A of this embodiment is described. Also, a temperature sensor that detects the temperature of the liquid L in the internal space S2 may be added to the liquid level meter 1A. If such a temperature sensor is provided, temperature correction can be made to a signal (resonance frequency) from the piezoelectric oscillation element 34. Therefore, the liquid level can be detected more accurately.

Fifth Embodiment

Next, a fifth embodiment of a liquid level meter according to the invention will be described.

Figure 19:
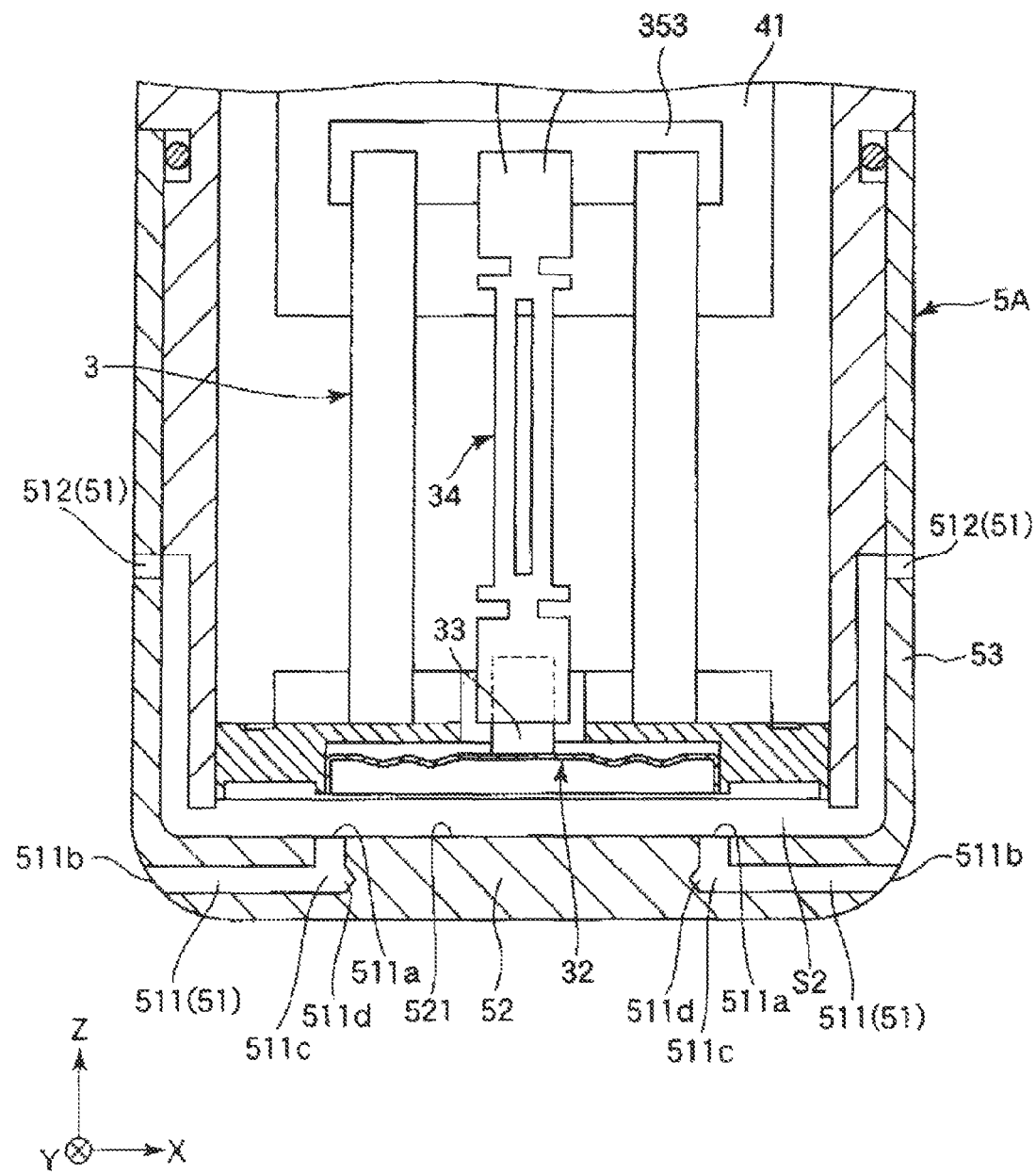
FIG. 19 is a sectional view of a liquid level meter according to a fifth embodiment of the invention.

FIG. 19 is a sectional view of a liquid level meter according to the fifth embodiment of the invention.

Hereinafter, the liquid level meter of the fifth embodiment will be described mainly in terms of its differences from the fourth embodiment. Similar parts will not be described further in detail.

The liquid level meter according to the fifth embodiment of the invention is similar to the fourth embodiment except that the configuration of the cap is different. Similar configurations to the fourth embodiments are denoted by the same reference numerals.

A cap 5A shown in FIG. 19 has, in the flexure portion 511c of each first hole 511, a depressed portion 511d depressed from the inner peripheral surface of the first hole 511. The depressed portion 511d is formed to face the outer opening 511b. When a site on the side of the opening 511b from the flexure portion 511c of the first hole 511 is referred to as a first site, the depressed portion 511d is formed coaxially with the first site. The depressed portion 511d has the function of capturing and storing a foreign matter such as sand entering into the first hole 511. Thus, with the formation of the depressed portion 511d, entry of the foreign matter into the internal space S2 can be restrained effectively.

Such a first hole 511 can be formed, for example, by drilling a hole from the side of the opening 511b to form the first site, then drilling a hole from the side of the opening 511a to form a second site, and connecting the second site to a site that is slightly more toward the proximal end side than toward the distal end of the first site.

According to the fifth embodiment, similar effects to the fourth embodiment can be achieved.

Sixth Embodiment

Next, a sixth embodiment of a liquid level meter according to the invention will be described.

Figure 20:
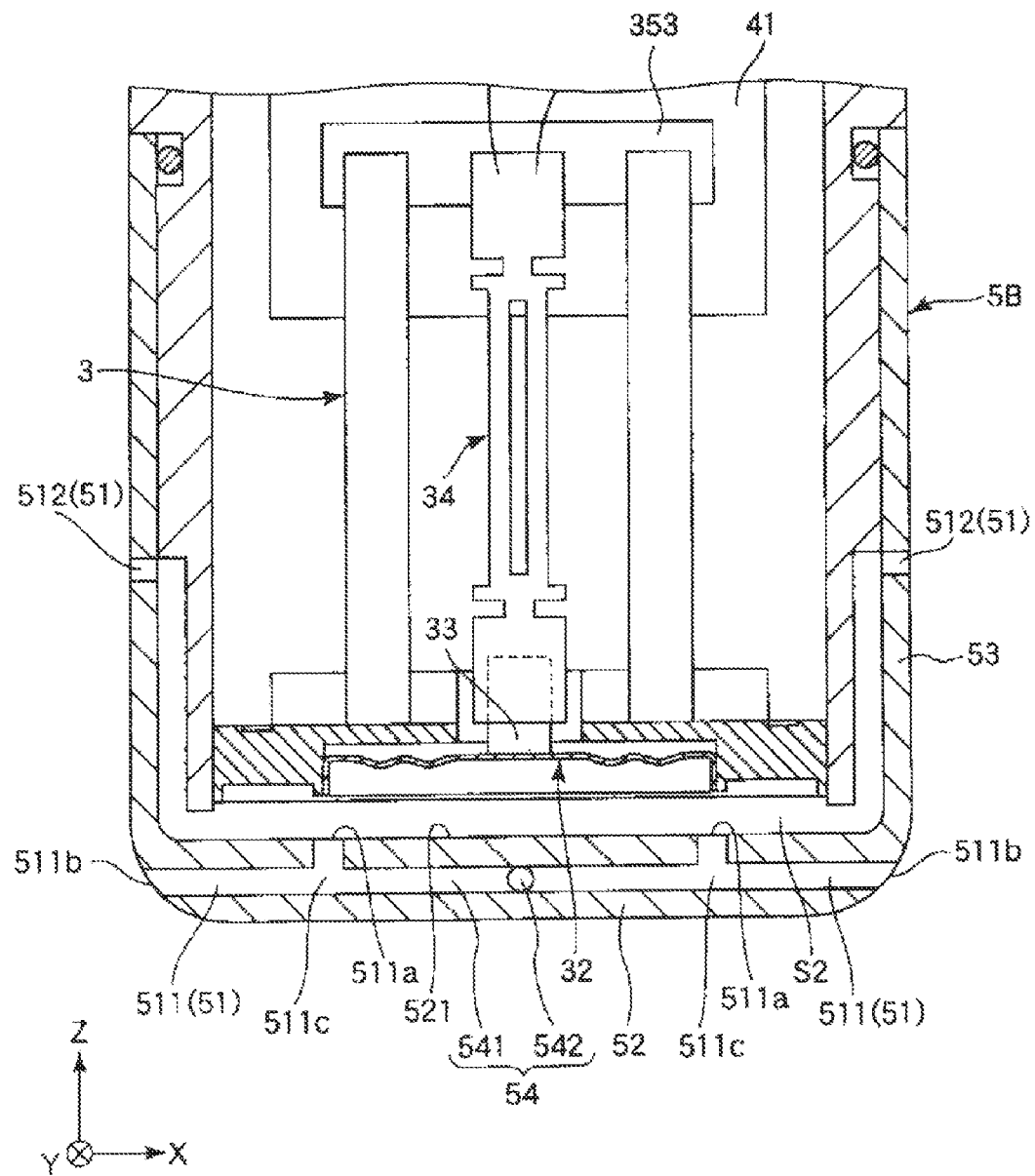
FIG. 20 is a sectional view of a liquid level meter according to a sixth embodiment of the invention.
Figure 21:
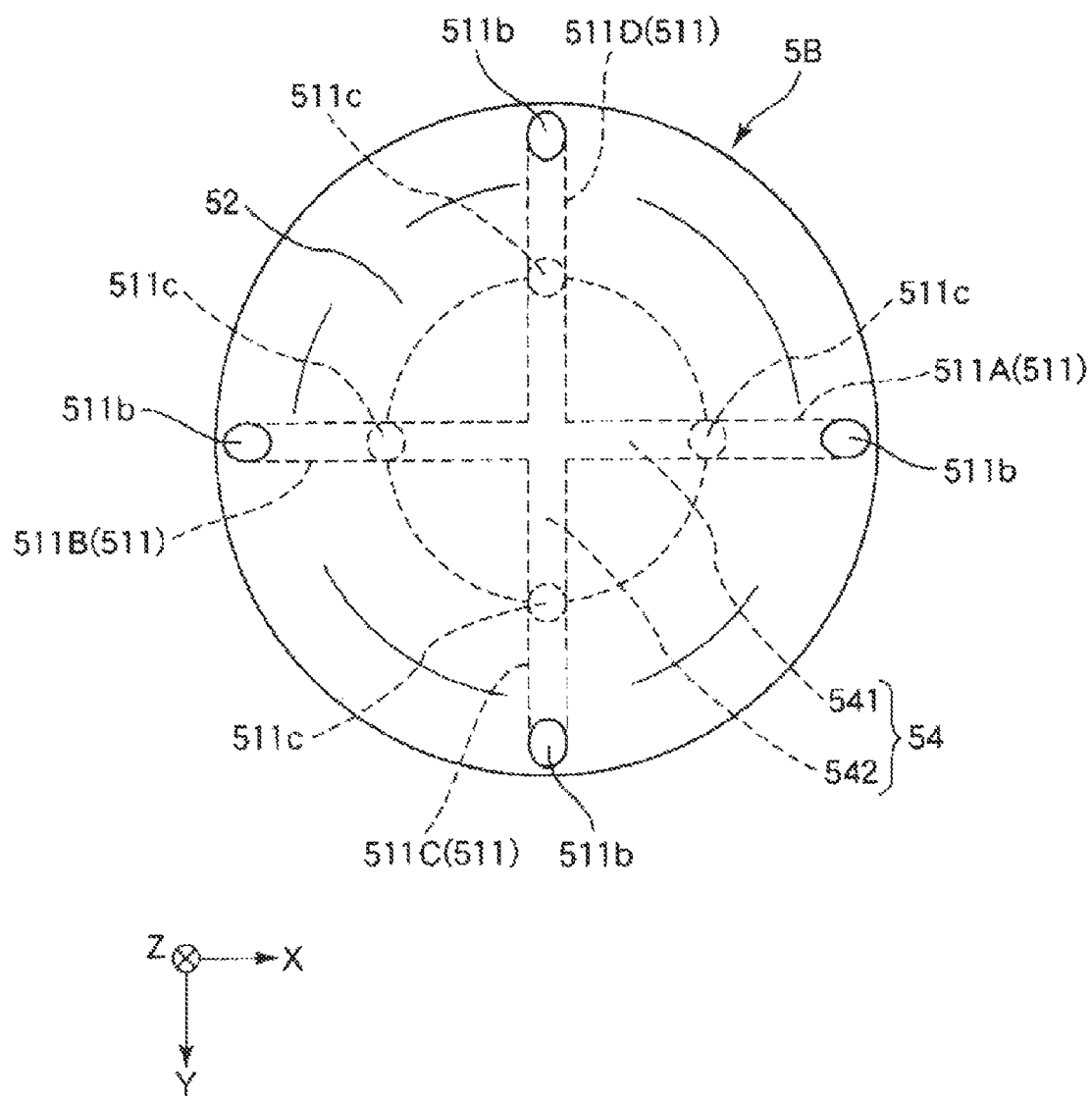
FIG. 21 is a plan view of a cap shown in FIG. 20.

FIG. 20 is a sectional view of a liquid level meter according to the sixth embodiment of the invention. FIG. 21 is a plan view of a cap shown in FIG. 20.

Hereinafter, the liquid level meter of the sixth embodiment will be described mainly in terms of its differences from the fourth embodiment. Similar parts will not be described further in detail.

The liquid level meter according to the sixth embodiment of the invention is similar to the fourth embodiment except that the configuration of the cap is different. Similar configurations to the fourth embodiments are denoted by the same reference numerals.

In a cap 5B shown in FIGS. 20 and 21, the first holes 511 are connected to each other via a connection hole 54 formed in the bottom portion 52. The connection hole 54 is in a cross shape formed by a first connection hole 541 and a second connection hole 542 crossing each other. One end of the first connection hole 541 is connected to the flexure portion 511c of the first hole 511 (511A) situated in the +X-axis direction, and the other end is connected to the flexure portion 511c of the first hole 511 (511B) situated in the −X-axis direction. Meanwhile, one end of the second connection hole 542 is connected to the flexure portion 511c of the first hole 511 (511C) situated in the +Y-axis direction, and the other end is connected to the flexure portion 511c of the first hole 511 (511D) situated in the −Y-axis direction. The first connection hole 541 is connected linearly to outer portions from the flexure portions 511c of the respective first holes 511A, 511B. The second connection hole 542 is connected linearly to the outer portions from the flexure portions 511c of the respective first holes 511C, 511D.

Connecting the middle parts of the plural first holes 511 to each other via the connection hole 54 in this way can achieve the following effects. First, the liquid L can be introduced smoothly into the internal space S2. Second, after the internal space S2 is filled with the liquid L, for example, a foreign matter entering from the opening 511b of the first hole 511A can be discharged from the opening 511b of the first hole 511B via the connection hole 54. Therefore, entry of a foreign matter into the internal space S2 can be restrained effectively. Particularly in this embodiment, since the first connection hole 541 and the outer portions from the flexure portions 511c of the respective first holes 511A, 511B are linearly connected to each other, as described above, a foreign matter can be smoothly led from the one opening 511b to the other opening 511b (the same applies to the second connection hole 542).

According to the sixth embodiment, similar effects to the fourth embodiment can be achieved.

Seventh Embodiment

Next, a seventh embodiment of a liquid level meter according to the invention will be described.

Figure 22:
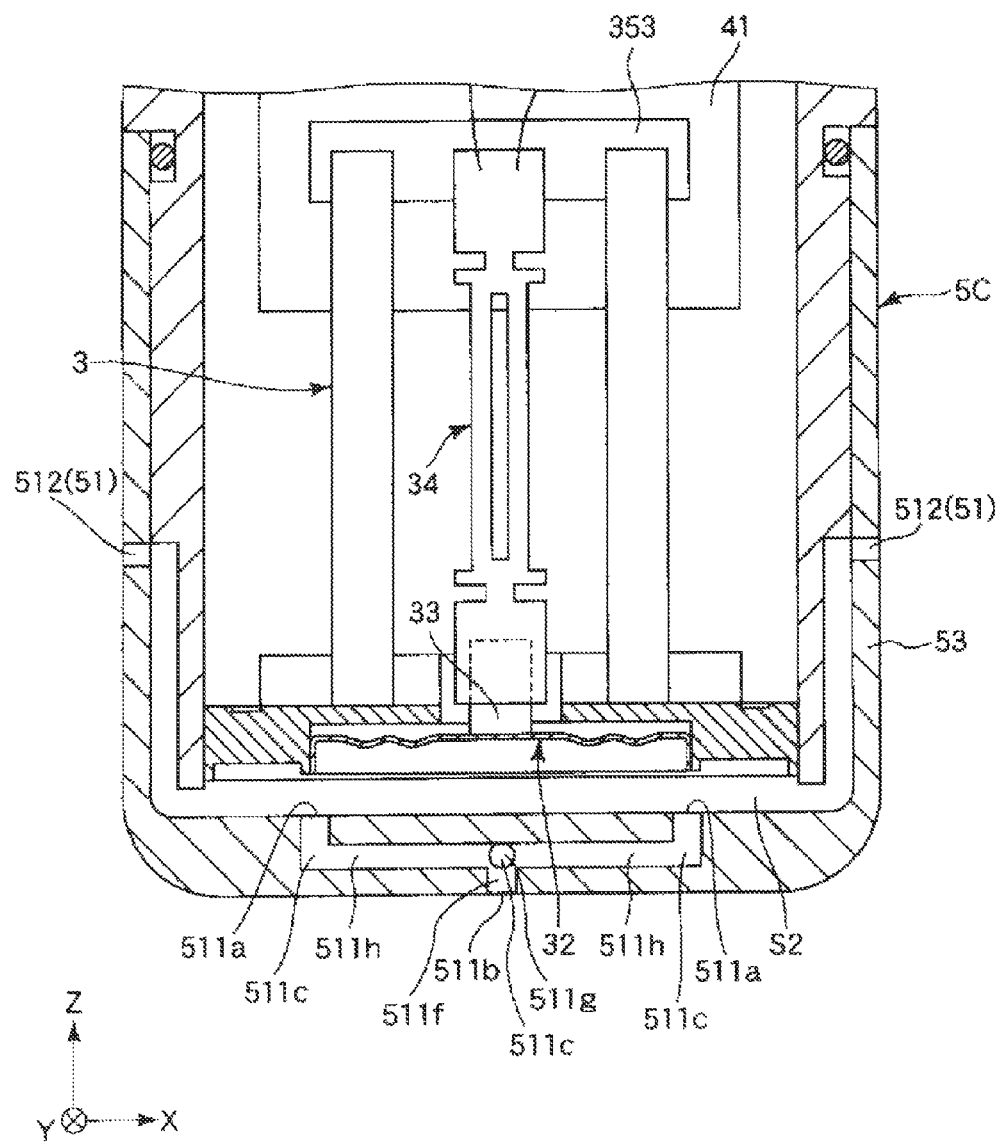
FIG. 22 is a sectional view of a liquid level meter according to a seventh embodiment of the invention.
Figure 23:
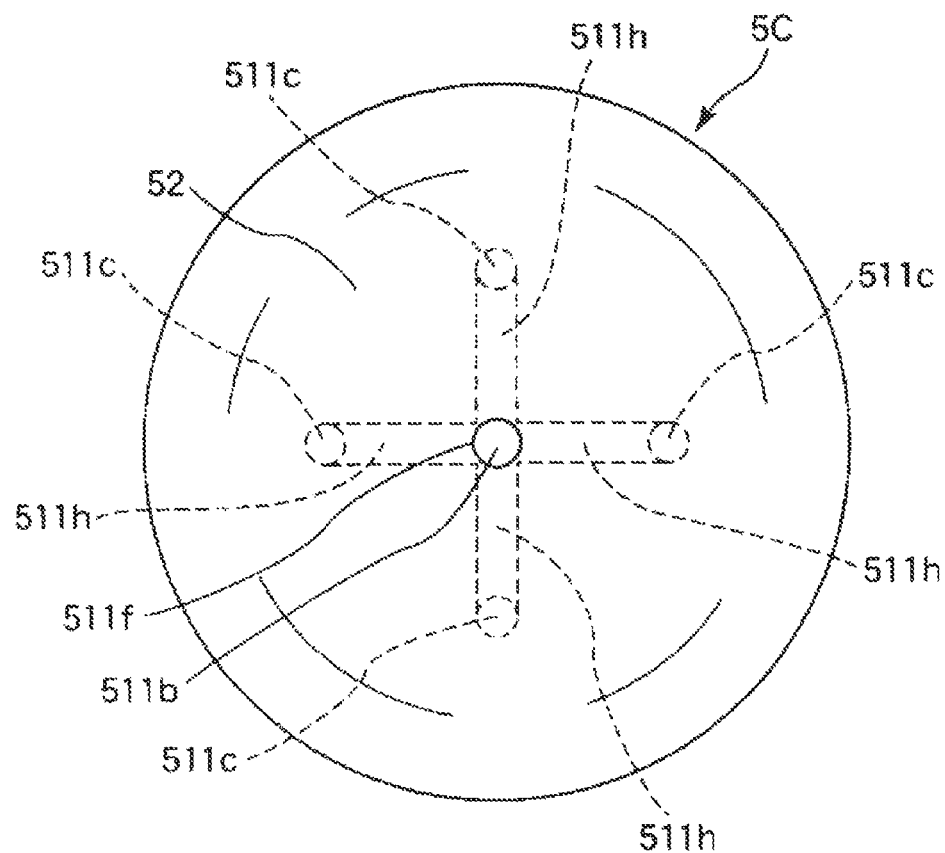
FIG. 23 is a plan view of a cap shown in FIG. 22.
Figure 23:
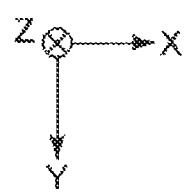

FIG. 22 is a sectional view of a liquid level meter according to the seventh embodiment of the invention. FIG. 23 is a plan view of a cap shown in FIG. 22.

Hereinafter, the liquid level meter of the seventh embodiment will be described mainly in terms of its differences from the fourth embodiment. Similar parts will not be described further in detail.

The liquid level meter according to the seventh embodiment of the invention is similar to the fourth embodiment except that the configuration of the cap is different. Similar configurations to the fourth embodiments are denoted by the same reference numerals.

In a cap 5C shown in FIGS. 22 and 23, one first hole 511 is formed in the bottom portion 52. The first hole 511 has an outer portion 511f extending from the outer opening 511b, a diverging portion 511g connected to a distal end of the outer portion 511f and diverging the outer portion 511f into four parts, and four inner portions 511h extending from the diverging portion 511g to the openings 511a. The outer portion 511f is formed along the center axis of the liquid level meter 1A. Meanwhile, the four inner portions 511h are formed away from each other with an equal spacing along the circumferential direction of the bottom portion 52.

Such a first hole 511 has a flexure portion 511c in the diverging portion 511g and in the middle of each inner portion 511h. By thus providing the flexure portions 511c at plural positions in the direction of flow of the liquid L, the flow speed of the liquid L passing through the first hole 511 can be lowered effectively. Also, since the first hole 511 has only one outer opening 511b, for example, in the case where the liquid level meter 1A is arranged for use in an ocean or river, a liquid L having a temperature difference (for example, a liquid L included in a different tidal current) can be prevented from being introduced simultaneously into the internal space S2. Thus, a sudden temperature change in the liquid L in the internal space S2 is restrained and a stable and accurate output (resonance frequency) is provided from the piezoelectric oscillation element 34.

According to the seventh embodiment, similar effects to the fourth embodiment can be achieved.

While, in this embodiment, the flexure portions 511c are formed in the diverging portion 511g and in the middle of each inner portion 511h, the flexure portions 511 are not limited to this example. For example, a flexure portion may be formed in the outer portion 511f. Also, the number of inner portions 511h is not limited to four and may be two, three, or five or more.

2. Warning System

Next, a warning system having the foregoing liquid level meter (a warning system according to the invention) will be described.

Figure 24:
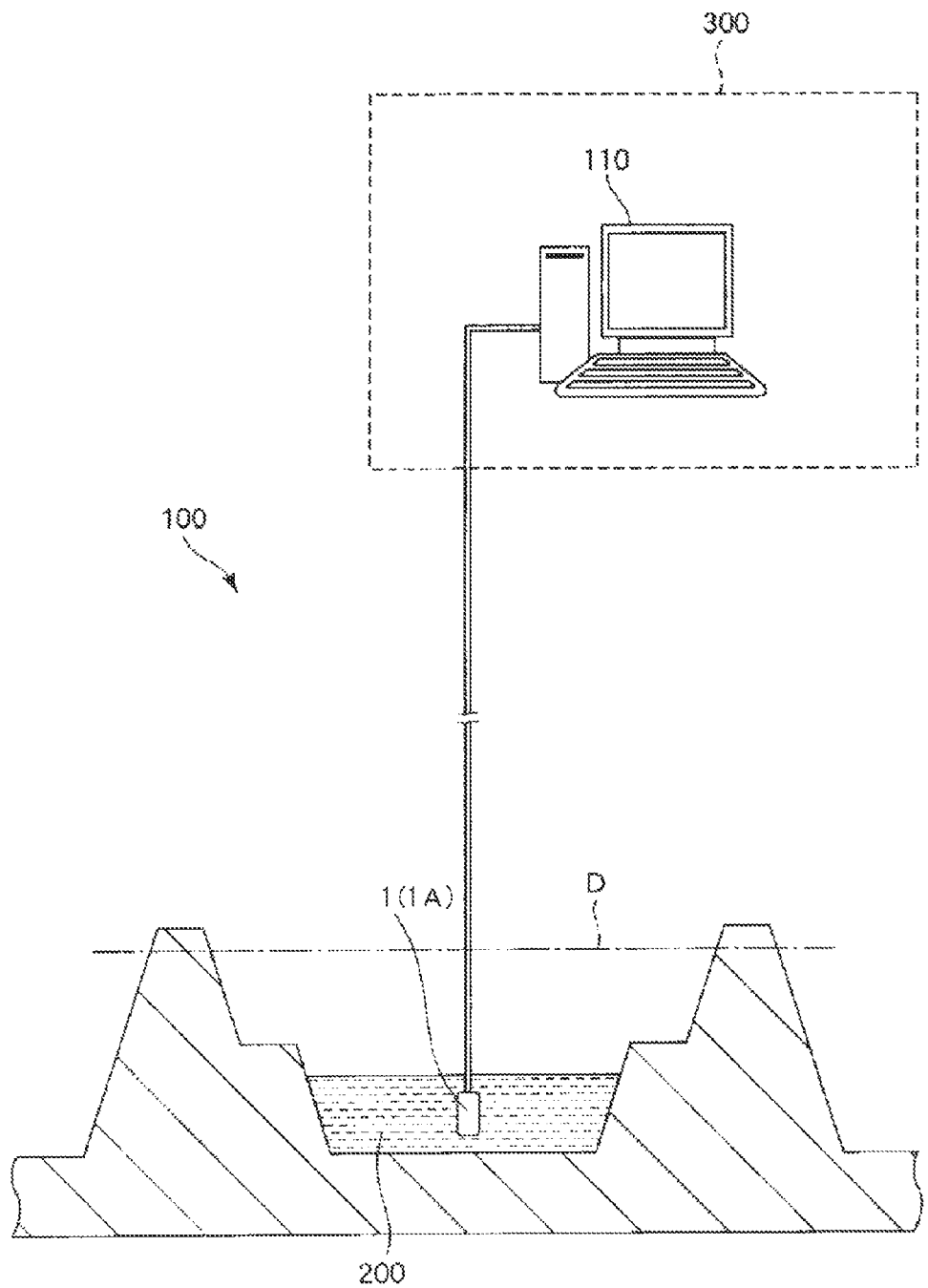
FIG. 24 shows an example of a warning system having a liquid level meter.

FIG. 24 shows an example of a warning system according to the invention.

A warning system 100 shown in FIG. 24 includes the foregoing liquid level meter 1 (1A), and a computer 110 connected to the liquid level meter 1 (1A) and arranged, for example, in a monitoring room. The liquid level meter 1 (1A) is arranged, for example, in a river 200. The liquid level meter 1 (1A) detects the liquid pressure with the foregoing mechanism and sends the result of detection to the computer 110 installed, for example, in a monitoring center 300. The computer 110 acquires the water level in the river based on the signal about the pressure from the liquid level meter 1 (1A). Based on the acquired water level, a monitoring officer grasps the status of the river. For example, if the water in the river increases (the water level rises) because of heavy rain or the like and reaches a dangerous water level D where the river bank can burst, the computer 110 notifies the monitoring officer of the danger by displaying a warning screen on the monitor or generating a warning sound from the speaker. In response to this, the monitoring officer calls on local residents to evacuate, for example, using an outdoor speaker. According to this warning system 100, since the water level in the river can be accurately grasped by the liquid level meter 1 (1A), a more accurate warning can be made.

The case where the warning system 100 is applied to a system for monitoring an increase in river water is described. However, the warning system 100 can also be applied, for example, to a system in which the liquid level meter 1 (1A) is arranged in an ocean to detect a tsunami, and to a system for detecting a landslide.

The liquid pressure meter, the liquid level meter and the warning system according to the invention are described based on the illustrated embodiments. However, the invention is not limited to these embodiments. The configuration of each part can be replaced with an arbitrary configuration having similar functions. Also, another arbitrary component may be added to the invention. Moreover, with respect to the liquid pressure meter and the liquid level meter according to the invention, the above embodiments may be suitably combined.

While the case where the sectional area of each hole formed in the cap is substantially constant along the extending direction is described in the above embodiments, the lateral sectional area of each hole may gradually decrease or gradually increase as it goes from the outer opening toward the inner opening. Also, while the case where the lateral sectional shape of each hole is circular is described in the above embodiments, the lateral sectional shape of each hole is not limited to this example and may be polygonal, for example, triangular or quadrilateral. Also, each hole may be formed, for example, as a groove, as long as each hole can connect the outside of the cap and the internal space.

Moreover, while the configuration having the housing and the cap formed as separate members is described in the above embodiments, the housing and the cap may be formed as an integrated member.

Furthermore, while the configuration having the flexure portion in the middle of the first hole is described in the above embodiments, a flexure portion may also be formed in the middle of the second hole, as in the first hole.

The entire disclosure of Japanese Patent Application No. 2013-005186, filed Jan. 16, 2013 and No. 2013-022027, filed Feb. 7, 2013 are expressly incorporated by reference herein.

What is claimed is:

1. A liquid pressure meter comprising:
a cylindrical exterior portion having an internal space in which a liquid to be measured flows; and
a pressure sensor provided inside the exterior portion and having a pressure sensitive surface;
wherein the exterior portion has first, second, third and fourth lower holes that are arranged at a vertically lower side of the exterior portion relative to the pressure sensitive surface, and the exterior portion has fifth, sixth, seventh and eighth upper holes that are arranged on a vertically upper side of the exterior portion relative to the pressure sensitive surface, and the first through eighth holes connect an inside of the internal space to an exterior area outside of the internal space, and
wherein a first of the first and fifth holes, a second pair of the second and sixth holes, a third pair of the third and seventh holes, and a fourth pair of the fourth and eighth holes are circumferentially spaced apart from each other by 90 degrees.

2. The liquid pressure meter according to claim 1, wherein an opening of each of the first through fourth lower holes adjacent the internal space is laterally shifted from a center of the pressure sensitive surface in a plan view.

3. The liquid pressure meter according to claim 1, wherein an opening of each of the first through fourth lower holes adjacent on an outer side of the exterior portion is laterally shifted from the pressure sensitive surface in a plan view.

4. The liquid pressure meter according to claim 3, wherein each of the first through fourth lower holes on the vertically lower side has a portion extending in a direction intersecting with a line normal to the pressure sensitive surface from the opening on the outer side of the exterior portion.

5. The liquid pressure meter according to claim 1, wherein each of the first through fourth lower holes on the vertically lower side has a bending portion between the opening on the outer side of the exterior portion and an opening adjacent the internal space.

6. The liquid pressure meter according to claim 5, wherein a depressed portion is arranged in the bending portion.

7. The liquid pressure meter according to claim 1, wherein the first through fourth lower holes are respectively communicably connected to the fifth through eighth upper holes via passages within the exterior portion.

8. The liquid pressure meter according to claim 1, wherein the pressure sensitive surface faces the internal space, and an oscillation element receives a stress corresponding to a displacement of the pressure sensitive surface.

9. A liquid level meter comprising the liquid pressure meter according to claim 1.

* * * * *